United States Patent [19]
Takahama et al.

[11] Patent Number: 6,154,312
[45] Date of Patent: Nov. 28, 2000

[54] OBJECTIVE LENS SWITCHING DEVICE

[75] Inventors: Yasuteru Takahama, Hino; Mitsuhiko Saito; Toshihiko Tanaka, both of Hachioji, all of Japan

[73] Assignee: Olympus Optical Co., Ltd., Tokyo, Japan

[21] Appl. No.: 09/158,471

[22] Filed: Sep. 22, 1998

[30] Foreign Application Priority Data

Sep. 22, 1997 [JP] Japan ................................. 9-257198
Sep. 24, 1997 [JP] Japan ................................. 9-258553

[51] Int. Cl.$^7$ ........................................... G02B 21/00
[52] U.S. Cl. .............................. 359/381; 359/821
[58] Field of Search .................. 359/368, 381, 359/384, 821

[56] References Cited

U.S. PATENT DOCUMENTS

| | | | |
|---|---|---|---|
| 4,486,078 | 12/1984 | Hashimoto et al. | 359/381 |
| 4,544,236 | 10/1985 | Endo . | |
| 4,961,636 | 10/1990 | Gaul et al. | 359/381 |
| 5,719,699 | 2/1998 | Otomo | 359/368 |

FOREIGN PATENT DOCUMENTS

| | | |
|---|---|---|
| 5-281457 | 10/1993 | Japan . |
| 7-128573 | 5/1995 | Japan . |
| 7-128574 | 5/1995 | Japan . |
| 7-311343 | 11/1995 | Japan . |
| 2539903 | 7/1996 | Japan . |

*Primary Examiner*—Darren Schuberg
*Assistant Examiner*—Mark A. Robinson
*Attorney, Agent, or Firm*—Frishauf, Holtz, Goodman, Langer & Chick, P.C.

[57] ABSTRACT

An objective lens switching device of the present invention is a device in which assembly and adjustment in order to correctly position each objective lens on an optical axis are easy and a switching action can quickly be performed with certainty without receiving an influence of a mounting condition of objective lenses or a change in the revolver over time in use. A CPU reads an angular displacement from an angle sensor from a revolution position of a turret outside a detection range of an engagement sensor and issues a command of start braking to a driver when the angular displacement reaches a predetermined given angle. A revolution position of the turret at which the CPU starts the braking is correctly set all the time since the detection range of the engagement sensor and an engagement position of the turret are correctly adjusted.

8 Claims, 18 Drawing Sheets

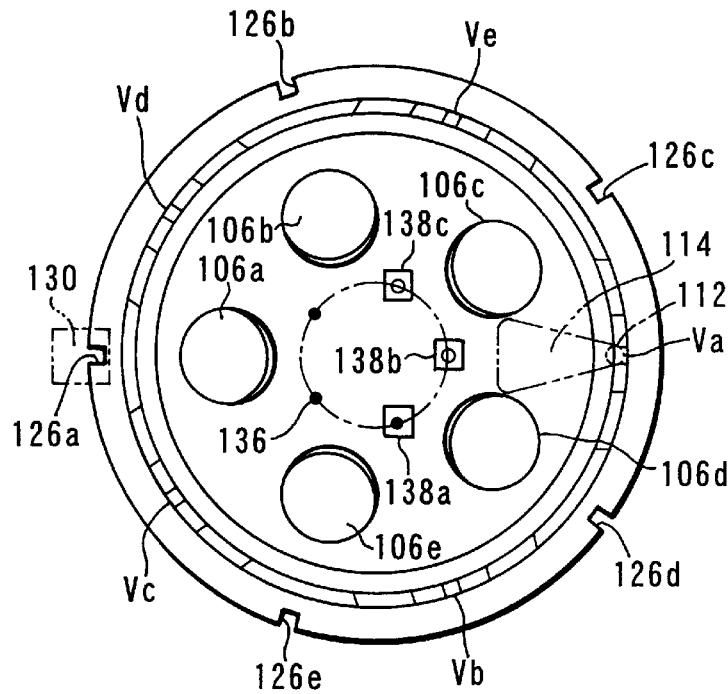
FIG. 6
| OBJECTIVE LENS MOUNTING SECTION | HALL ELEMENT | | |
|---|---|---|---|
| | a | b | c |
| a | ● | ○ | ○ |
| b | ● | ● | ○ |
| c | ● | ● | ● |
| d | ○ | ● | ● |
| e | ○ | ○ | ● |
● WITH MAGNET
○ WITH NO MAGNET
FIG. 7
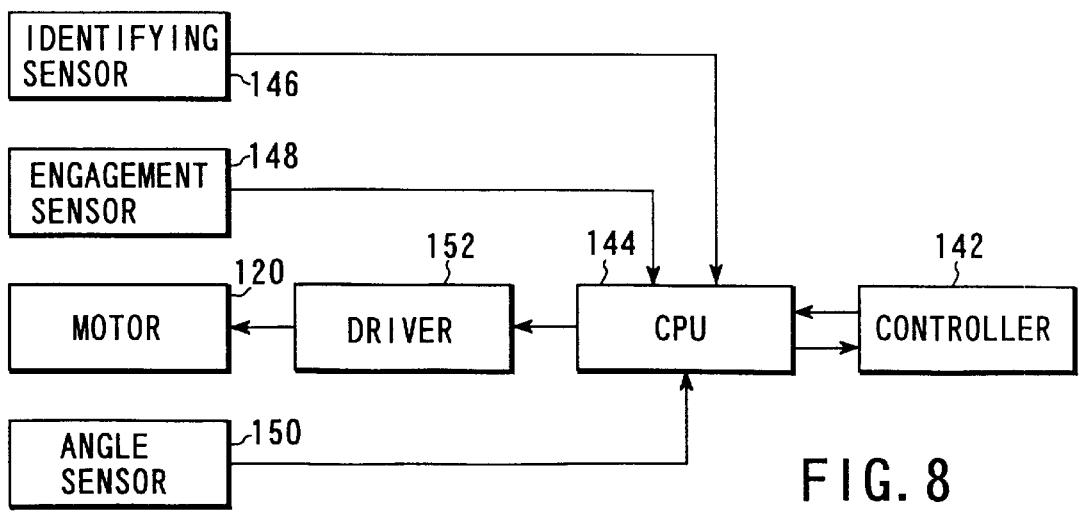
FIG. 8

| ELAPSED TIME | $t_c$ | $2t_c$ | $3t_c$ | --- | $nt_c$ |
|---|---|---|---|---|---|
| THE NUMBER OF PULSES | $P_c$ | $2P_c$ | $3P_c$ | --- | $nP_c$ |
FIG. 19
| THE NUMBER OF PULSES (COMPARISON) | 0 | 1 | 2 | 3 | --- |
|---|---|---|---|---|---|
| DRIVE VOLTAGE | $V_i$ | $V_i\left(1+\frac{5}{100}\right)$ | $V_i\left(1+\frac{10}{100}\right)$ | $V_i\left(1+\frac{15}{100}\right)$ | --- |
FIG. 20A
| THE NUMBER OF PULSES (COMPARISON) | -1 | -2 | -3 | --- |
|---|---|---|---|---|
| DRIVE VOLTAGE | $V_i\left(1-\frac{5}{100}\right)$ | $V_i\left(1-\frac{10}{100}\right)$ | $V_i\left(1-\frac{15}{100}\right)$ | --- |
FIG. 20B
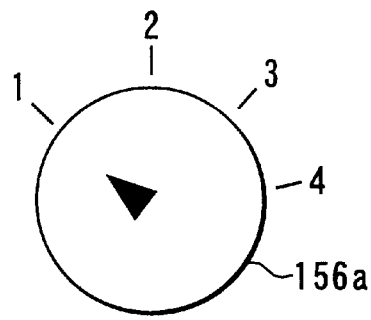
FIG. 21A
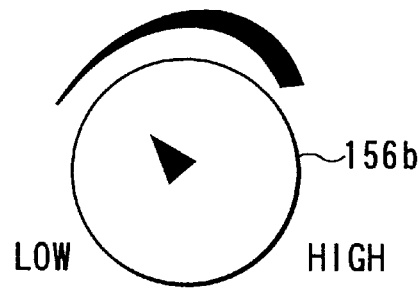
FIG. 21B

| ELAPSED TIME | $t_c$ | $2t_c$ | $3t_c$ | --- |
|---|---|---|---|---|
| THE NUMBER OF PULSES | $\frac{5}{10}P_c$ | $5\times\frac{2}{10}P_c$ | $5\times\frac{3}{10}P_c$ | --- |

FIG. 23A

| ELAPSED TIME | $t_c$ | $2t_c$ | $3t_c$ | --- |
|---|---|---|---|---|
| THE NUMBER OF PULSES | $\frac{5}{7}P_c$ | $5\times\frac{2}{7}P_c$ | $5\times\frac{3}{7}P_c$ | --- |

FIG. 23B

| ELAPSED TIME | $t_c$ | $2t_c$ | $3t_c$ | --- |
|---|---|---|---|---|
| THE NUMBER OF PULSES | $P_c$ | $2P_c$ | $3P_c$ | --- |

FIG. 23C

| ELAPSED TIME | $t_c$ | $2t_c$ | $3t_c$ | --- |
|---|---|---|---|---|
| THE NUMBER OF PULSES | $\frac{5}{4}P_c$ | $5\times\frac{2}{4}P_c$ | $5\times\frac{3}{4}P_c$ | --- |

OBJECTIVE LENS SWITCHING DEVICE

BACKGROUND OF THE INVENTION

The present invention relates to an objective lens switching device in an optical apparatus such as a microscope, in which device an objective lens with a desired magnification suitable for a viewed object is selected from among a plurality of objective lenses and positioned on a viewing optical path.

An objective lens switching device, generally called a revolver, has been used in an optical apparatus such as a conventional microscope and in the device, an objective lens with a desired magnification has been selected so as to be suitable for a viewed object and positioned on a viewing optical path. In such an objective lens switching device, a revolver moving section is revolved by driving a motor with a predetermined voltage and revolution of a revolver is stopped with provision of a mechanically engaging mechanism between the revolver moving and stationary sections. The engaging mechanism works such that each time when an optical axis of each objective lens mounted on the revolver coincides with a viewing optical axis of the optical apparatus such as a microscope, the revolver moving and stationary sections are mechanically engaged and thus the objective lens is positioned for holding in place.

Such structures have been disclosed in, for example, Jpn. Pat. Appln. KOKAI Publication Nos. 5-281457 and 7-311343, and Published Japanese Patent No. 2539903.

FIG. 1 is a sectional view showing an example of a structure of a conventional revolver switching device disclosed in Jpn. Pat. Appln. KOKAI Publication No. 5-281457 (hereinafter referred to as first conventional example).

As shown in FIG. 1, this switching device comprises: a revolver 4 on which a plurality of objective lenses 2 are mounted; a motor 6 which revolves and brakes the revolver 4; and a transfer mechanism 8 which transfers rotation of the motor 6 to the revolver 4. Besides, this switching device comprises a mark plate 10 having two index sections which give a deceleration timing and a stop timing of the motor 6 to a rotary shaft of the motor 6 or the transfer mechanism 8.

On the other hand, the stationary section of the switching device is provided with a first and second sensors 12, 14 are provided respectively corresponding to the two indexes, With these indexes in use, deceleration of the motor 6 gets started when a desired objective lens 2 reaches before the optical axis, the motor 6 is stopped when the desired objective lens 2 reaches a point in the vicinity of the optical axis after deceleration of the motor 6 is sufficiently decelerated and thereby the desired objective lens 2 can quickly be positioned in place to align with the optical axis of the optical apparatus to precision.

Besides, the revolver 4 is provided with an engaging mechanism comprising a click ball 16 fixed to a rotary section and a leaf spring 18 fixed to a stationary section. A reference numeral 20 indicates a viewed object.

FIGS. 2 and 3 are views showing a structure a revolver device described Jpn. Pat. Appln. KOKAI Publication No. 7-311343 (hereinafter referred to as second conventional example).

In FIGS. 2 and 3, this revolver device comprises a microscope body 22 and an electric revolver body 24. In more detail, the revolver device comprises: a revolver 26 holding a plurality of objective lenses, not shown; a motor 28 for revolution and braking of the revolver 26; a positioning section 30 for mechanically stopping the revolver 26 at a predetermined position which has been decelerated by braking with the motor 28; a revolver control circuit 46 in a control section 42 for controlling the motor 28; and a fixed-amount revolution detecting section 32 for detecting revolution of the revolver 26 by a predetermined amount.

The fixed-amount revolution detecting section 32 is provided with a light interceptor 36 having a photo-interrupter 34 and notches 36a. The revolver 26 is provided with a rail 40 with which a spherical member is in a sliding contact.

The microscope body 22 is provided with an operating section 40 issuing a command of revolving the revolver 26 and a revolver control circuit 46 including a braking command circuit 48 and a motor output circuit 50.

The revolver device is constituted such that the control circuit 46 receives a detection result from the fixed-amount revolution detecting section 32 through a delay circuit 44 and braking of the motor 28 gets started after a preset time length of a delay is elapsed.

With such a constitution in use, since adjustment for correct positioning of a desired objective lens is enabled by electrical adjustment of a delay time length, an adjustment operation can be saved in terms of labor.

FIG. 4 is an illustration of a structure of a revolver revolving device (hereinafter referred to as a third conventional example) disclosed in Published Japanese Patent No. 2539903.

This revolver rotating device comprises: a motor drive apparatus 54 for revolving a revolver 52; a code apparatus 56 detecting a position of revolution of the revolver 52; a key board 58 and a remote control connecting terminal 60 as a selecting means for selecting in advance a revolver hole which is a target position; a control section 62 for controlling the number of rotation of the motor drive apparatus 54; and an engaging means, not shown, for fixing the selected revolver hole at the target position.

Deceleration marks 66 for the start of braking of the revolver 52 in correspondence to the number of the objective lenses are disposed on a code disc 64 of the code apparatus 56 and the number of rotation of the motor drive apparatus 54 is decreased before the revolver 52 reaches the target position with the help of cooperation of the marks 66 and the sensor 68. Hence, a desired objective lens can quickly be positioned at a target potion to precision. A reference numeral 70 indicates a taco generator and 72 a circuitry network.

However, a request for automation of a revolver switching device in recent years has been harder to be met in the aforementioned examples. That is, while there have been requests of increasing the number of objective lenses mounted and shortening a switching time between objective lenses, these are incompatible requests. In order to enable theses incompatible requests to be compatible, there is a need for controlling revolution of the revolver so that the revolver achieves correct and quick positioning of a desired objective lens on an optical axis.

However, since mounting conditions of objective lenses (the number of the objective lenses, kinds thereof and mounting positions thereof) are varied for different users and thereby a load imposed on a motor in revolving a revolver is also changed. Hence the most suitable control to stoppage has been difficult to be realized.

For example, in the first conventional example, when a desired objective lens 2 is positioned on an optical axis, a reflection type sensor 12 detects a reflection pattern of the mark plate 10 before the click ball 16 enters an engaging range of the leaf spring 18 and an electronic control circuit sufficiently decelerates rotation of the motor 6 with this detection signal on hand. Then, when the click ball 16 enters the engaging range of the leaf spring 18, the transmission type sensor 14 detects a notch in the mark plate 10. The electronic control circuit completely stops rotation of the motor 6 in response to the detection signal and thereby the click ball 16 enters the engaging range of the leaf spring 18 in an engaged manner and the desired objective lens 2 comes to be held on the optical axis.

Positional relations between the reflection type sensor 12 and the refection pattern of the mark plate 10, and between the transmission type sensor 14 and the notch of the mark plate 10 are optimized by correct adjustment in assembly so that engagement between the click ball 16 and the leaf spring 18 can be secured.

However, in the case of the first conventional example, the mark plate 10 having two index sections which give a deceleration timing and a stop timing of the motor 6 is not mounted on a rotary shaft of a turret, but on a rotary shaft of the motor 6 or the transfer mechanism 8. For this reason, when a backlash of the transfer mechanism 8 is large or there is a spatial fluctuation in each of objective lens switching devices, adjustment in positional relations between each sensor 12, 14 and the mark plate 10 is difficult. Besides, since there are inevitable adjustments both of the reflection type sensor 12 and the transmission type sensor 14 with correctness, it takes a long time to perform the adjustments.

In addition, while a load inertia to the motor 6 is greatly different according to a different mounting condition of objective lenses (the number of the objective lenses, kinds thereof, mounting positions thereof and the like), adjustment in a positional relation is always fixed regardless of the mounting condition. In any case, very difficult is adjustment of positions of the sensors 12, 14 and the mark plate 10 in a manner such that engagement between the click ball 16 and the leaf spring 18 is secured with neither overrun nor shortage of revolver 4.

Furthermore, in the second conventional example shown in FIGS. 2 and 3, adjustment of timing in braking of the motor 28 in order to position a desired objective lens on the optical axis is performed by electric means.

After the revolver 26 is activated, for example the photo-interrupter 34 detects the notch 36a of the light intercepting plate 36 and outputs the detection output, wherein for example, the photo-interrupter 34 and the light intercepting plate 36 are provided as the detecting section 32 for detecting that revolution is made by a fixed amount. The control circuit 46 receives the detection output and outputs a delay output after a preset time length of a delay is elapsed and with this timing, braking of the motor 28 is carried out. If a delay time length is changed, adjustment of timing in braking can be adjusted with no adjustment of a position of the light intercepting plate 36. The delay time length is optimally adjusted in each revolver device so that the click ball 38 is run over or stopped before a V groove 40.

However, since the delay time length is a fixed value for each revolver device and therefore cannot correspond to a change in a mounting condition of an objective lens (the number of the objective lenses, kinds thereof and mounting positions thereof), there is a risk that the click ball 38 cannot properly engage in the groove 40 in a mounting condition. On the other hand, if a change over time in use of the revolver device causes a change in a load on the motor 28 or motor characteristics themselves, such an inconvenience described above is further apt to occur.

Besides, in the third conventional example shown in FIG. 4, deceleration marks 66 corresponding to the number of objective lenses which marks are provided in order to start braking of the revolver 52 are formed on a code disc 64 each in the optimal size such that a desired objective lens may quickly be located at a target position with correctness.

However, in the third conventional example as well, a braking effect of a revolver 52 caused by a deceleration mark 66 is fixed in each revolver device and there 4 is a problem, therefore, the braking effect cannot sufficiently be adapted for the above mentioned mounting condition of an objective lens or a change over time in use.

As a common problem in the above mentioned first to third examples, there can be raised an inconvenience that a braking condition of a motor cannot be changed so as to be suitable for a kind of objective lens for substitution. That is, in any case, a switching speed (time required for switching) is changed by a change in the mounting condition of an objective lens or the like.

In addition, if a speed is changed, a shock when a sudden stoppage occurs is naturally changed with a variety in degree in each condition. The shock in the stoppage not only influences durability (abrasion resistance) but also scatters dust and dirt around the device, which thereby causes a great problem if a switching device is necessary to be used in a specifically clean environment (for example, clean room and the like).

Especially when a liquid immersion objective lens such as an oil immersion objective lens, a water immersion objective lens or the like is positioned on a viewing optical axis of an optical apparatus such as a microscope, there arises a problem of bubble production. When switching between objective lenses is performed in a manual operation, it is only required to conduct a switching action slowly and deliberately so as not to produce bubbles with all possible efforts. However, in the case of a conventional switching device which is electrically operated, since the same braking action has been applied regardless of a kind of objective lens for substitution, there has been arisen inconvenience that a leading edge of an objective lens comes to contact a specimen surface at a great speed on which water or oil adheres and as a result bubbles are inevitably produced.

BRIEF SUMMARY OF THE INVENTION

The present invention has been made in light of the actual state of the related prior art and accordingly it is an object of the present invention to provide an objective lens switching device in which assembly and adjustment in order to correctly position each objective lens on an optical axis are easy, a time length for the switching and oscillation when a revolver gets stopped are stable without being influenced by a mounting condition of objective lenses or a change in the revolver over time in use, and a switching action can quickly be performed with certainty.

It is another object of the present invention to provide an objective lens switching device in which not only can the optimal switching action be performed according to a kind of an objective lens for substitution and a desire of a user, but a time length of the switching can be variable.

That is, an objective lens switching device of the present invention comprises: a turret on which a plurality of objective lenses are mountable; drive means for electrically revolving the turret; transfer means for transferring a revolving power by the drive means to the turret: mechanically engaging means for correctly positioning one of the plurality of objective lenses on an optical axis of an optical apparatus;

operating means for inputting an objective lens switching command; and control means for controlling rotation of the drive means according to the switching command from the operating means, wherein the objective lens switching device in which one of the plurality of objective lenses is selected and positioned on the optical axis of an optical apparatus is characterized by that the objective lens switching device further comprises engagement detecting means for detecting that a revolution position of the turret is in an engagement range of the engaging means; and angle detecting means for detecting an angular displacement of the turret, and that the control means determines a braking position of the drive means based on signals of the engagement detecting means and the angle detecting means.

According to the objective lens switching device of the present invention, the control means reads an angular displacement of the turret from a revolution position when the turret moves out a detection range of the engagement detecting means with the angle detecting means and gives a command of start braking to the drive means if the angular displacement has reached a predetermined, specific angle. The control means can always correctly determine a timing when the control means issues a command of start braking to the drive means, in other word a revolution position of the turret where the braking gets started, if the detection range, more exactly the center position of the detection range, of the engagement detecting means and an engagement position of the turret by the mechanically engaging means correctly coincide with each other. Therefore, only if positional adjustment between the center of the engagement detecting means and the engagement position of the turret is performed, the turret can be engaged with the engaging means with certainty without being affected by any influence of backlash in transfer means such as gears. Hence, an objective lens switching action with high reliability can be achieved by adjustment in a short time.

By how much a braking force of the drive means or a start position of braking is changed by a difference between actual measurement of a moving speed of the turret and a reference moving speed thereof is empirically obtained as the optimal values in advance and the optimal values are stored as a reference table inside of the control means. With such a control executed, since, even if an inertia load imposed on the drive means is changed due to a change in mounting condition of an objective lens during a viewing operation or a mechanical resistance of a turret revolving section is changed over time in use and thereby a load on the drive means is changed, the optimal braking on the drive means can be performed in adaptation to various conditions, an objective lens switching action which is always stable can be realized.

Besides, an objective lens switching device of the present invention comprises: a turret on which a plurality of objective lenses are mountable; drive means for electrically revolving the turret; transfer means for transferring a revolving power by. the drive means to the turret: mechanically engaging means for correctly positioning one of the plurality of objective lenses on an optical axis of an optical apparatus; operating means for inputting an objective lens switching command; and control means for controlling rotation of the drive means according the switching command from the operating means, wherein the objective lens switching device in which one of the plurality of objective lenses is selected and positioned on the optical axis of an optical apparatus is characterized by that the objective lens switching device further comprises engagement detecting means for detecting that a revolution position of the turret is in an engagement range of the engaging means; and angle detecting means for detecting an angular displacement of the turret, and the control means performs control to hold a revolving speed of the turret in a specific range based on a signal detected by the angle detecting means.

According to the objective lens switching device, the control means detects a current position from a signal of the angle detecting means when a switching operation between objective lenses is performed and thereby sends a drive signal to the drive means so that a revolution speed assumes a given, constant speed in a specific range of the turret.

In a magnifying view apparatus such as a microscope, a relative distance (hereinafter referred to as WD) between a objective lens and a viewed specimen is small and since an objective lens with an especially high magnification has an extremely small WD, it is desirable that mounted objective lenses other than a desired objective lens used for viewing are as remote as possible from a viewed specimen surface. Therefore, the turret is generally inclined from a horizontal plane at 15 to 20 degrees. In this case, there arises a revolving moment in the turret due to biased weight distribution of objective lenses with the exception that the maximal number of objective lenses each with the same weight and the same gravity center are mounted. Accordingly, there is a risk to occur overrun or shortage of travel by use of a switching operation pattern, even when braking is applied with the same timing and in the same condition.

Suppose that the number of mountable objective lenses is, for example, 5. Switching action patterns of the turret are totally counted to 5×4=20 in number and the reason why a braking condition of the drive means is effectively changed for each switching action pattern of the turret is as described above. Therefore, since a braking condition of the drive means can optimally be set based on an moving speed of the turret which is measured for each objective lens switching action pattern, the optimal objective lens switching action can be realized in adaptation to a mounting condition of an objective lens.

Besides, if the moving speeds are repeatedly measured, there arises an advantage that a loading condition of the turret by objective lenses can be grasped.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention

FIG. 6 is a schematic plan view showing a structure of the turret of FIG. 5A;

FIG. 7 is a representation showing a logical relation among digital codes based on three Hall elements 138a to 138c of FIG. 6;

FIG. 8 is a block diagram showing a constitution of an electric control system of an objective lens switching device;

FIG. 19 is a table showing a relation between the elapsed time and the number of pulses counted at the angle sensor 150;

FIG. 20A is a table showing a relation between the number of pulses and the drive voltage;

FIG. 20B is a table showing a relation between the number of pulses and the drive voltage;

FIG. 21A is a view showing a first example of an objective lens switching speed adjusting switch in a seventh embodiment of the present invention;

FIG. 21B is a view showing a second example of an objective lens switching speed adjusting switch in a seventh embodiment of the present invention;

FIG. 23A is a table showing a relation between the elapsed time and the number of pulses counted at the angle sensor 150;

FIG. 23B is a table showing a relation between the elapsed time and the number of pulses counted at the angle sensor 150;

FIG. 23C is a table showing a relation between the elapsed time and the number of pulses counted at the angle sensor 150; and FIG. 23D is a table showing a relation between the elapsed time and the number of pulses counted at the angle sensor 150.

DETAILED DESCRIPTION OF THE INVENTION

Described below will be embodiments of the present invention in reference to the accompanying drawings.

Figure 5A:
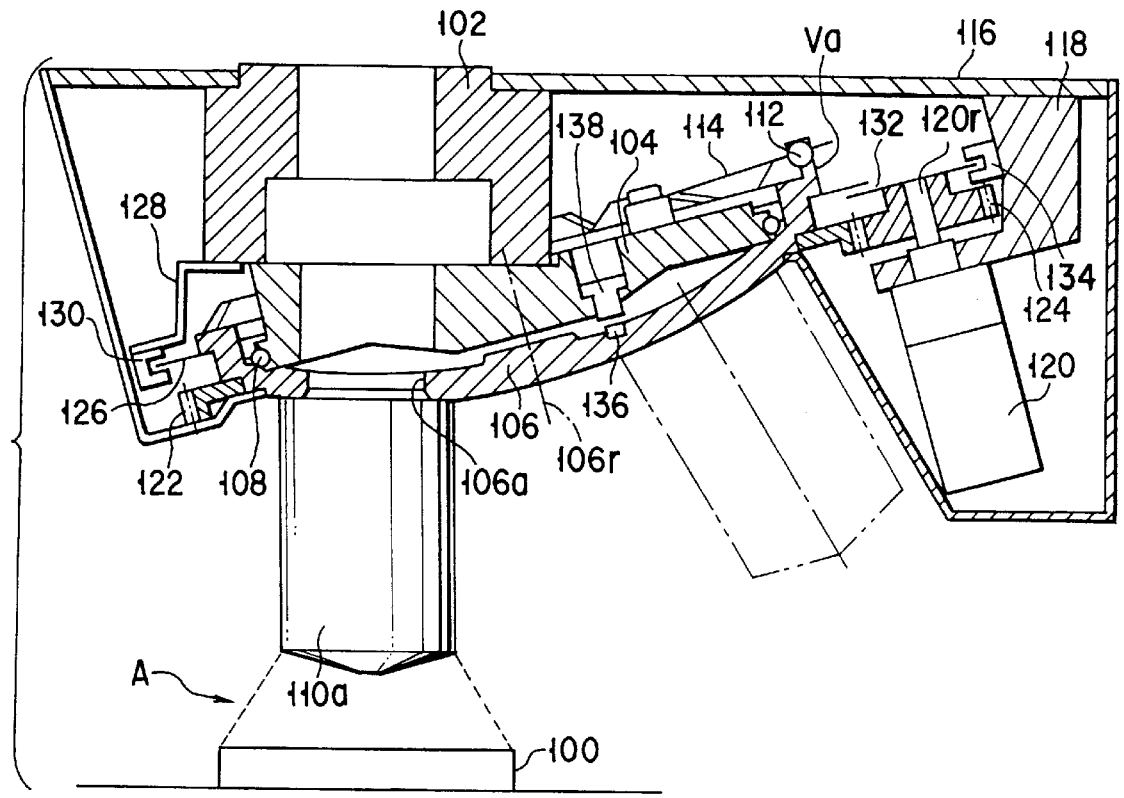
FIG. 5A is a sectional view showing a structure of an objective lens switching device as a first embodiment of the present invention.
Figure 5B:
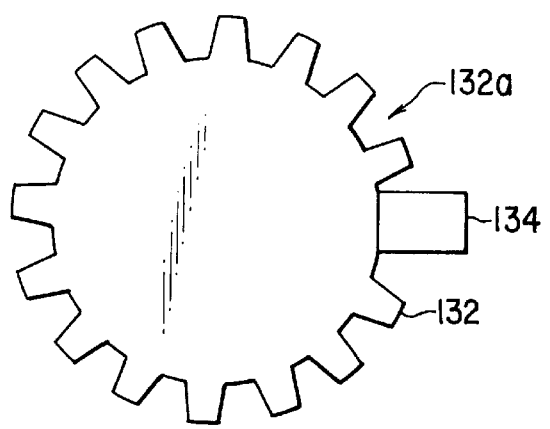
FIG. 5B is a plan view showing an example of a configuration of a gear and a slit plate, and a photo-sensor of FIG. 5A.

FIG. 5A is a sectional view showing a structure of an objective lens switching device as a first embodiment of the present invention, FIG. 5B is a plan view showing an example of a configuration of a slit plate of FIG. 5A and FIG. 6 is a schematic plan view showing a structure of the turret of FIG. 5A.

A support member 104 is mounted to a mounting member 102 which is in turn mounted to the body of an optical apparatus such as a microscope, not shown, and a turret 106 as a revolving member is supported by the support member 104 in a revolving manner with many balls 108 which work as a guide interposing therebetween. The turret 106 comprises objective lens mounting sections 106a to 106e to which mounted can be a plurality (in this case, 5 lenses) of objective lenses 110a to 110e each having different magnification. A revolving axis 106r of the turret 106 has an inclination of 15 degrees with respect to a viewing optical axis in order to locate objective lenses other than an objective lens used for viewing at positions spaced away from a viewed specimen 100.

The engaging grooves Va to Ve corresponding to the five objective lens mounting sections 106a to 106e are formed in the peripheral region of the turret 106 at five locations along the periphery. On the other hand, a leaf spring 114 at the fore end of which a click ball 112 is fast held is fixedly mounted on the upper surface of the support member 104. The leaf spring 114 works so that it presses the click ball 112 in an engaging manner into one of the engaging grooves Va to Ve located along the periphery of the turret 106 and when the click ball 112 is engaged in one of the engaging grooves Va to Ve, one of the objective lenses 110a to 110e mounted on the turret 106 is correctly aligned with the optical axis. The leaf spring 114 and the click ball 112 constitute engaging means in which a given engaging force and a contact relation are produced between the turret 106 and the support member 104.

A stationary plate 116 extends from the mounting member 102 and a motor 120 is mounted to the stationary plate 116 with a motor fixing member 118 interposing therebetween. A gear 122 is provided along the periphery of the turret 106 and the gear 122 transfers rotation of the motor 120 to the turret 106 while the rotation is decelerated. The gear 122 meshes with a gear 124 fixedly mounted to a rotary shaft 120r of the motor 120.

A detection plate 126 in the shape of a disc having five notches 126a to 126e which correspond with the five objective lens mounting sections 106a to 106e is fixed outside the periphery of the turret 106. On the other hand, a photo-sensor 130 such as photo-interrupter is fixed to the mounting member 102 at a position opposed to the detection plate 126 with a mounting plate 128 interposing therebetween. The detection plate 126 and the photo-sensor 130 constitutes an engagement sensor 148 described later.

The engagement sensor 148 produces a specific detection output when one of the engaging grooves Va to Ve of the turret 106 and the click ball 112 are engaged with each other. A stop position of the turret 106 by engagement between one of the engaging grooves Va to Ve of the turret 106 and the click ball 112 is adjusted in terms of a position such that the center of a detection width of the engagement sensor 148 based on one of the notches 126a to 126e of the detection plate 126 is correctly coincides with the stop position.

A slit plate 132 along the periphery of which many slits 132a are radially formed in a uniform manner as shown in FIG. 51 is mounted to the gear 124 which is fixedly mounted to the rotary shaft 120r of the motor 120 and a photo-sensor 134 such as a photo-interrupter is mounted to the motor fixing member 118 opposed to the slit plate 132. In other words, the slit plate 132 and the photo-sensor 134 produce a pulse signal in correspondence to an angular displacement of the rotary shaft 120r of the motor 120. The slit plate 132 and the photo-sensor 134 constitute an angular sensor 150 for detecting an angle of rotation of the motor 120.

Three identifiers, for example index magnets 136, are mounted on the turret 106 and three sensors, such as Hall elements 138 which detect magnetism, are mounted on the periphery of a circle on the support member 104 respectively in a corresponding manner to the index magnets 136. The index magnets 136 and the Hall elements 138 constitute a identifying sensor 146 for identifying any of the objective lens mounting sections 106a to 106e.

Then, described will be an identifying method for the objective lens mounting sections 106a to 106e by the identifying sensor 146.

As shown in FIG. 6, the three Hall elements 138a, 138b, 138c on the turret 106 are opposed to at least one of the three index magnets 136a to 136c when one of the five objective lenses 110a to 110e comes to be positioned on the viewing optical axis, and. the Hall elements 138a to 138c produce respective different digital codes corresponding to a hole which is formed at each of the five objective lens mounting sections 106a to 106e.

FIG. 7 is a representation showing a logical relation among digital codes based on three Hall elements 138a to 138c. In FIGS. 6 and 7, a solid circle mark indicates that a magnet is present in an opposed position to a Hall element but an open circle mark indicates that a magnet is not present there.

Then, described will be an electric control system of the present embodiment.

FIG. 8 is a block diagram showing a constitution of an electric control system of an objective lens switching device.

In FIG. 8, a controller 142 comprises switches of various kinds for operating sections of an optical apparatus including an object lens switching device and a CPU 144 is connected to the controller 142, wherein the CPU 144 receives an input signal from the controller 142 and obtains signals to rotates the motor 120 or stop its rotation based on signals of the identifying sensor 146, the engagement sensor 148 and the angle sensor 150. The CPU 144 drives the motor 120 through a driver 152 based on the signal. The CPU 144 further sends drive signals to sections of the optical apparatus, not shown.

As switches included in the controller 142, there are provided, for example, five objective designating switches for positioning a target objective lens on an optical axis, a focus knob for achieving focus of an objective lens, a voltage volume controller for adjusting a brightness of a light source and the like. Besides, not only provided is a switch to input an operation command to each of the sections of the optical apparatus, but a display section to display conditions of the respective sections of the optical apparatus including the objective switching device is also provided in the controller 142, though the switch and the display section are not shown.

Figure 9:
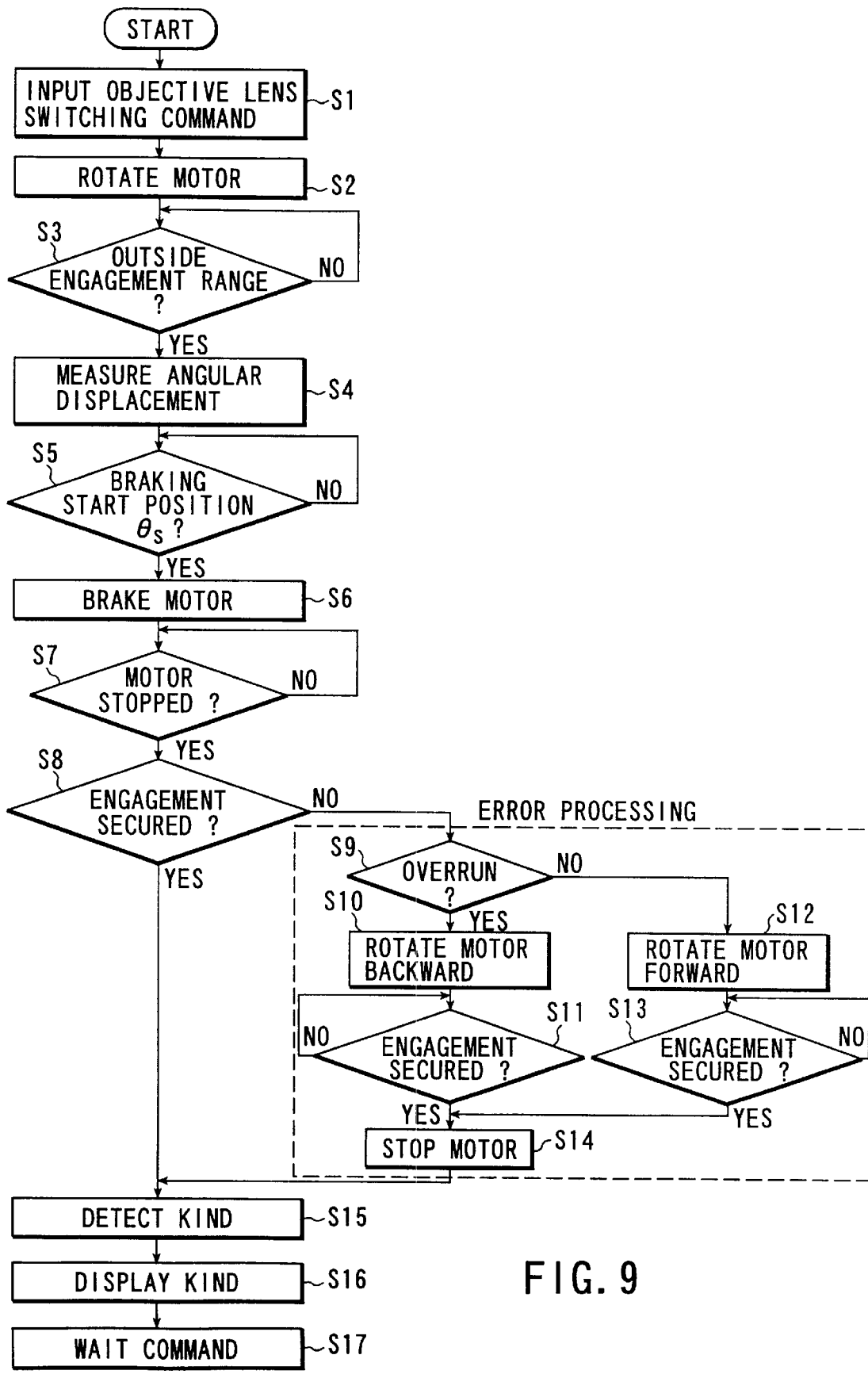
FIG. 9 is a flow chart illustrating action of the objective lens device in the first embodiment.

Then, described will be action of the first embodiment of an objective lens switching device which is structured in such a way in reference to the flow chart of FIG. 9.

When, first of all, an electric source of the optical apparatus such as a microscope, not shown, including the objective lens switching device is turned on, the identifying sensor 146 detects which of the objective lens mounting sections 106a to 106e is positioned on the viewing optical axis of the optical apparatus and a display which corresponds to one of the objective lens mounting sections 106a to 106e is presented on the display section (not shown) of the controller 142 based on the detection.

At step S1, an objective lens switching command is input through a switch of the controller 142. Then, at step S2, the CPU 144 compares a kind of an objective lens mounting section 106 currently detected by the identifying sensor 146 with a kind of an objective lens mounting section 106a to 106e for substitution which is input from the controller and determines a direction of revolution and the number of switching stages (one stage means a single switching operation between a pair of objective lens mounting sections adjacent to each other) for the turret 106. Thereby, a command on rotation of the motor 120 is issued to the driver 152.

After the motor 120 is activated, at step S3, it is determined whether or not the turret 106 is free of engagement by the engagement sensor 148. At this point, when it is detected that the turret 106 is out of engagement, program flow goes to step S4 and at step S4, the angle sensor 150 is reset to 0 as a measured value and measurement on angular displacement is commenced from this position.

An angle θs of revolution of the turret 106 from the time of the detection of engagement cancellation by the engagement sensor 148 to the time when braking gets started before a location of one of the objective lens mounting sections 106a to 106e which is substituted, and an angle θc of revolution of the turret 106 to a position where the click ball 112 and one of the engaging grooves Va to Ve of the turret 106 are just engaged are set in advance in the CPU 144.

At step S5, the CPU 144 determines whether or not a measuring value by the angle sensor 150 reaches an angle of rotation of the motor shaft 120r which corresponds to the angle θs of revolution of the turret 106 set in advance. At this point, if it is determined that the measuring value is an angular position θs where the braking gets started, program flow goes to step S6 and a braking command for the motor 120 is issued from the CPU 144 to the driver 152.

At step 7, the turret 106 gets completely stopped through establishment of mechanical engagement secured by a deflection elastic force of the leaf spring 114 when the click ball 112 enters an engagement range of the engaging grooves Va to Ve provided along the outer periphery of the turret 106 while the turret 106 is decelerated in company with the braking of the motor 120.

Then, at step S8, an output of the engagement sensor 148 is confirmed in the CPU 114 at the same time as the stoppage of the motor 120. At this point, if the engagement is secured, program flow goes to step S15. On the other hand, if the engagement is not secured, program flow goes to step S9 for error processing.

That is, at step S9, a signal of the angle sensor 150 is confirmed. If a measured value of the confirmed signal is larger as compared with an angle θs of revolution of the turret 106 which is set in advance, program flow goes to step S10 and the motor 120 is rotated in a backward direction at as slow a speed as possible. On the other hand, if a measured value of the confirmed signal is smaller as compared with the angle θs of revolution, program flow goes to step S12 and the motor 120 are also rotated in a forward direction.

At steps S11 and S13, an output of the engagement sensor 148 is confirmed and if it is confirmed again that the click ball 112 has entered the engagement range, program flow goes to step S14 and the motor 120 is immediately stopped.

Then, at step S15, an output of the identifying sensor 146 is confirmed by the CPU 144. If it is confirmed that the output shows coincidence with one of the objective lens mounting sections 106a to 106e to which a switching command input to the controller 142 is directed for substitution, at step S16 a kind of the one of the objective lens mounting sections 106a to 106e is presented on the display section of the controller 142. Thereafter, at step S17, program flow stays awaiting till a next switching command is input from the controller 142.

Figure 10:
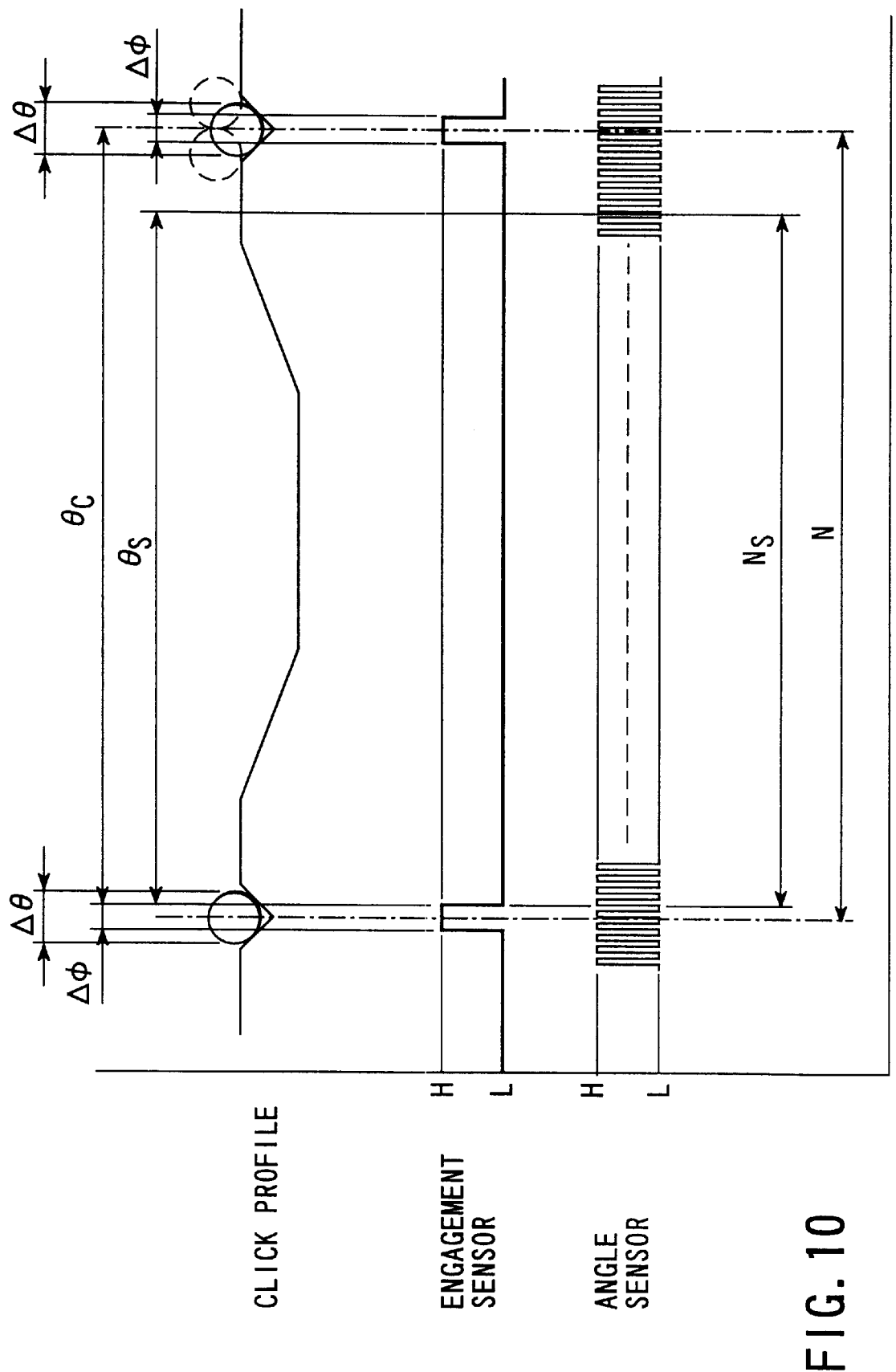
FIG. 10 is a timing chart illustrating a relation between an engagement sensor 148 or an angle sensor 150, and engaging grooves Va, Vb of a turret 106.

Herein, the series of operations will be further in a more detailed manner described starting a relation between the engagement sensor 148 or the angle sensor 150 and the engaging grooves Va, Vb of the turret 106 in reference to the timing chart of FIG. 10.

A profile of a click shows part of the outer periphery of the turret 106 in an extended form on a straight line. The engaging grooves Va, Vb each in the form of a V letter correctly correspond to the objective lens mounting sections 106a, 106b of the turret 106.

An engagement detection range $\Delta\phi$ by the engagement sensor 148 is set smaller than a range $\Delta\phi$ (hereinafter referred to as an engagement range) in which the click ball 112 is pulled into a V groove by a pressing force of the leaf spring 114 and the center of the engagement detection range $\Delta\phi$ is adjusted so as to correctly coincide with the center of the V groove. The angle sensor 150 outputs a signal in the shape of a pulse in equal intervals corresponding to an angular displacement of the turret 106 and a total number N of pulses when the turret 106 is revolved between two adjacent V grooves is set, for example, tens of pulses in a design stage.

When an objective lens mounting section 106a is switched to an objective lens mounting section 106b by a command of the controller 144, first of all the motor 120 is activated and when the turret 106 is revolved by $\Delta\phi/2$ from the center of the engaging groove Va, a detection output of the engagement sensor 148 is switched from a high level (H) to a low level (L). At this point, a measured value from the angle sensor 150 is reset in the CPU 144 and an angular displacement from this position is measured as the number of pulses output from the angle sensor 150.

When the number of pulses from the angle sensor 150 reaches Ns, a signal to instruct braking of the motor 120 is supplied to the driver 152 from the CPU 144. The number Ns of pulses of the angle sensor 150 is set so that a stop position of the turret 106 does not fail to be in the engagement range $\Delta\theta$, when the braking of the motor 120 gets started at this position. Therefore, if braking of the motor 120 gets started at this timing, the click ball is pulled into the engaging groove Vb of the turret 106b and thereby the objective lens mounting section 106b correctly stops at a position where the objective lens mounting section 106b coincides with the optical axis.

As mentioned above, in the first embodiment, measurement of an angle of revolution of the turret by the angular sensor is made from the time when engagement by the engaging means gets just undone and braking of the motor gets started when the measured value reaches a preset angle. Hence, braking position of the motor can correctly set without receiving any influence of backlash of gears which transfer rotation of the motor to the turret. Besides, since an adjustment operation for certain engagement of the turret requires only adjustment of a detection range of the engagement sensor and an engagement range of a V groove, there is an advantage that correct adjustment can be completed in a short time using a jig and the like.

Therefore, the first embodiment can be expected to show an effect that an objective lens switching action can be realized with high reliability by adjustment in a short time.

While, in the first embodiment, the motor for revolving the turret is disposed outside the turret, there is no specific limitation to this configuration. For example, realized can be such a configuration that a gear is disposed inside the engaging section of the outer periphery of the turret and the motor is disposed inside the turret so as to mesh with the gear.

A idler gear may be provided between the gear of the motor shaft and the gear mounted to the turret. In this case, a degree of freedom in configuration of the motor is increased.

Then, described will be the second embodiment of the present invention.

The second embodiment has the same structure as that of the first embodiment and a difference is only in control method.

Figure 11:
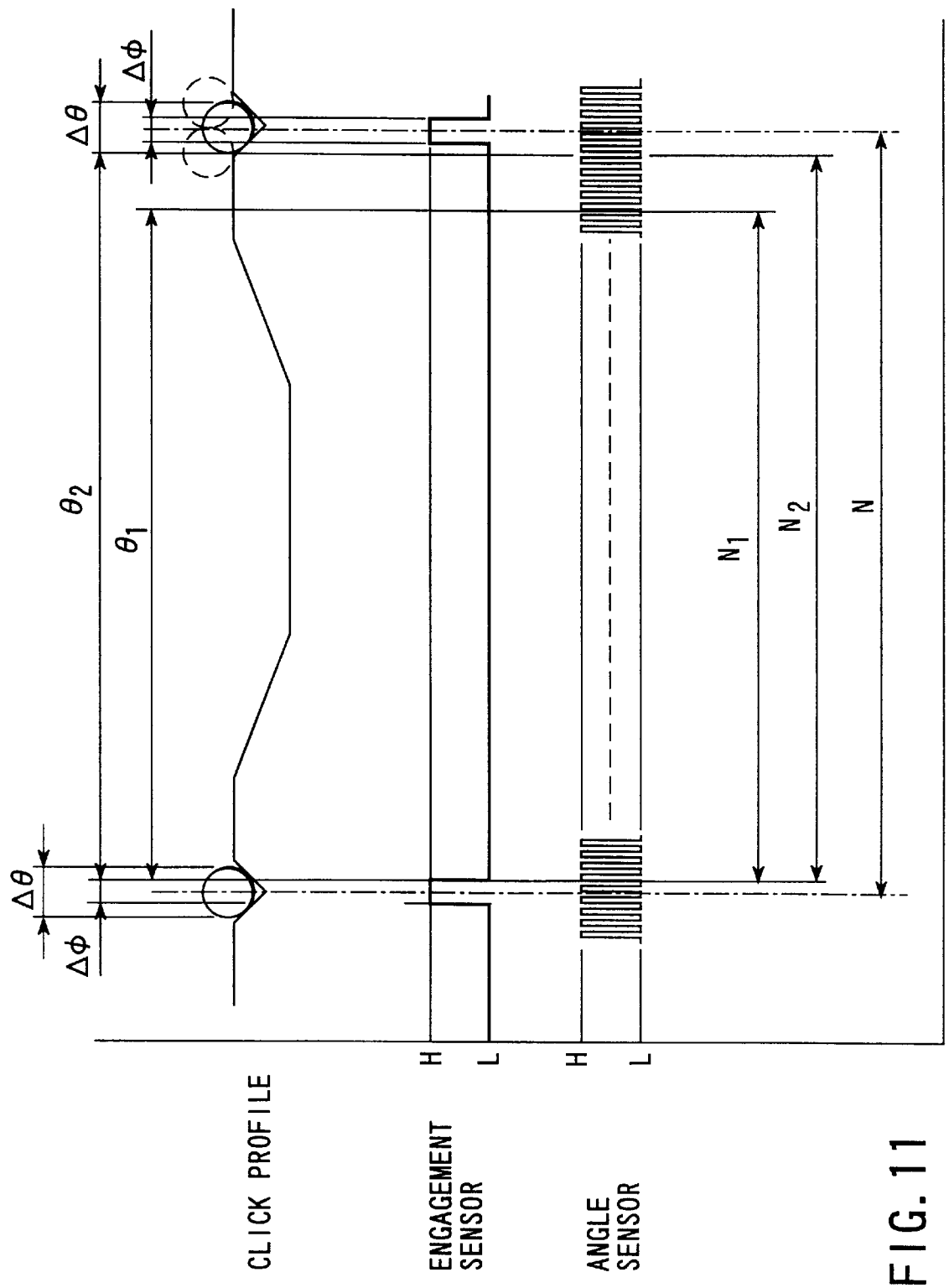
FIG. 11 is a timing chart illustrating a control method of a second embodiment of the present invention.

FIG. 11 is a timing chart illustrating a control method of the second embodiment of the present invention.

The second embodiment includes two stages in which, when the turret is braked, the turret is driven at a low speed while being sufficiently decelerated before the engagement range of the engaging means and thereafter the motor gets completely stopped at almost the same time as when the turret enters the engagement range of the engaging means.

As mentioned above, in the figure the engaging grooves Va, Vb each in the shape of a V letter correctly correspond with the objective lens mounting sections 106a, 106b of the turret 106. The engagement detection range $\Delta\phi$ of the engagement sensor 148 is set smaller than the engagement range $\Delta\theta$ and the center of the engagement detection range $\Delta\phi$ is adjusted so as to coincide just with the center of the V groove.

A signal in the shape of pulse is output at regular intervals from the angle sensor 150 corresponding to an angular displacement of the turret 106. A total number N of pulses when the turret travels between two adjacent V grooves is set, for example, tens of pulses in a design.

The above mentioned positional relations are the same as those of the first embodiment.

In the case where the objective lens mounting section 106a is switched to the objective lens mounting section 106b, when the motor 120 is activated and the turret 106 is revolved by $\Delta\phi/2$ from the center of the engaging groove Va, a detection output of the engagement sensor 148 is switched from an H level to a L level. The CPU 144 resets a measured value form the angle sensor 150 at this point and an angular displacement from this position is measured as the number of pulses output from the angle sensor 150. The actions so far are the same as those of the first embodiment.

Then, at the time when the number of pulses from the angle sensor 150 reaches $N_1$, a signal to instruct deceleration of the motor 120 is supplied to the driver 152 from the CPU 144. The number $N_1$ of pulses of the angle sensor 150 is preset such that, when the motor 120 is decelerated at this position, the turret 106 can be decelerated to a given speed of revolution without fail before the turret enters the engagement range $\Delta\theta$. After the revolution of the turret 106 is decelerated to the given low speed by the deceleration of the motor 120 and when the number of pulses of the angle sensor 150 reaches $N_2$, a signal to completely stop the motor 120 is supplied to the driver 152 from the CPU 144.

The number $N_2$ of pulses of the angle sensor 150 is preset such that the click ball 112 just enters the engagement range $\Delta\theta$ of the engaging groove Vb when this value is measured. As methods for deceleration and complete stoppage of the motor 120, it is general to short-circuit both terminals therebetween for a short time and a braking effect is great in terms of a braking force.

Figure 12:
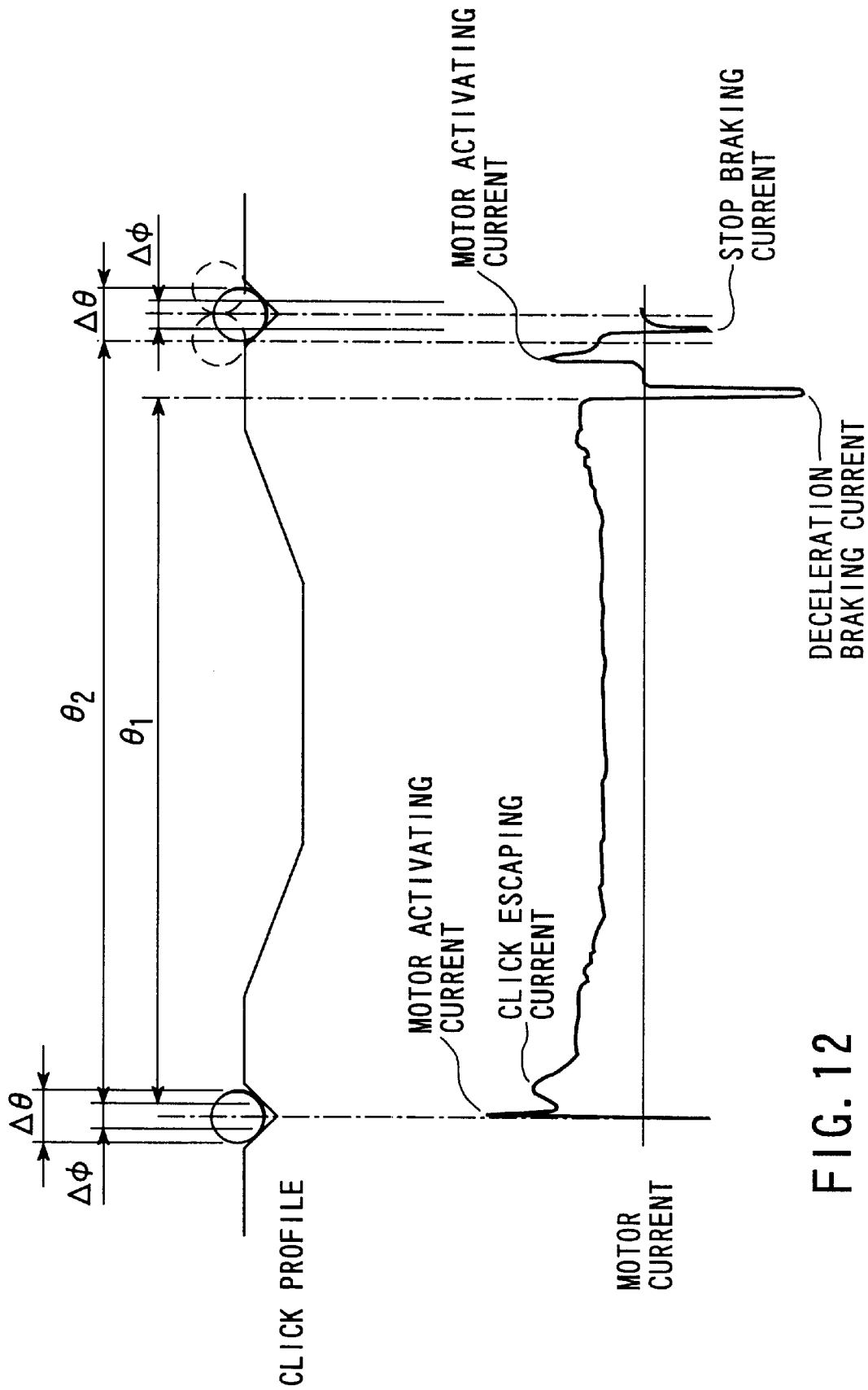
FIG. 12 is a timing chart illustrating a change in motor current in action of the second embodiment.

FIG. 12 is a timing chart illustrating a change in motor current in action of the second embodiment. FIG. 12 shows that the terminals of the motor 120 are short-circuited for a short time length to decelerates the motor 120 when the number of pulses of the angle sensor 150 reaches $N_1$ (at this time, a backward current flows), thereafter the motor 120 is applied with a low voltage to be driven at a low speed and then the terminals of the motor 120 are again short-circuited therebetween to stop rotation of the motor 120 when the number of pulses of the angle sensor 150 reaches $N_2$.

With the control method mentioned above adopted, revolution of the turret is sufficiently decelerated and the turret revolves at a constant low speed when the turret enters the engagement range of the engaging means. Therefore, the embodiment has an effect that the engagement of the turret can quickly be secured with certainty without receiving any influence of an inertial load due to a difference in mounting condition of objective lens. In addition, the second embodiment has an advantage that, since there is no need for a specific sensor for deceleration, the structure of the second embodiment is as simple as that of the first embodiment.

Then, described will be an objective lens switching device of the third embodiment of the present invention.

The third embodiment is different from the first and second embodiments described above in electronic constitutions and control methods thereof but the other points, that is a mechanical structures, positional relations between an engagement sensor or an angle sensor and a click shape and the like are the same as those in the first and second embodiments. Therefore, descriptions on the other points are omitted.

Figure 13:
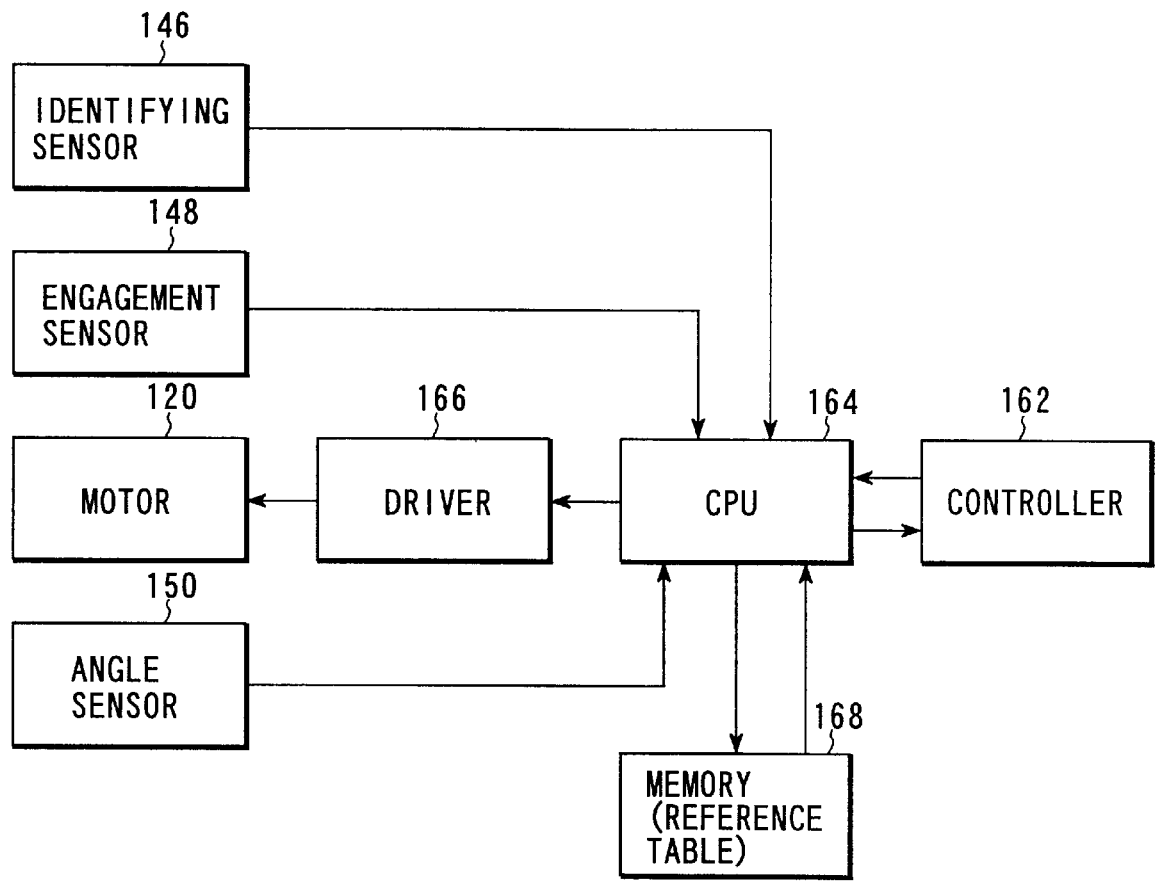
FIG. 13 is a block diagram showing a constitution of an electric system of a third embodiment of the present invention.

FIG. 13 is a block diagram showing a constitution of electric system of a third embodiment of the present invention.

In FIG. 13, a controller 162 comprises switches of various kinds for operating sections of an optical apparatus including an object lens switching device and a CPU 164 is connected to the controller 142, wherein the CPU 164 receives an input signal from the controller 162 and obtains signals to rotate the motor 120 or stop its rotation based on signals of the identifying sensor 146, the engagement sensor 148 and the angle sensor 150. The CPU 164 drives the motor 120 through a driver 166 based on the signal.

A memory 168 for storing a reference table is connected to the CPU 164 and the reference table is used for determining a start position for deceleration based on an action speed in a partial action range during each switching action. Besides, the CPU 164 sends drive signals to sections of an optical apparatus, not shown.

The controller 162 comprises, as in the first and second embodiments mentioned above, there are provided, for example, five objective designating switches for positioning an objective lens for substitution on the optical axis, a focus knob for achieving focus of an objective lens, a voltage volume controller for adjusting a brightness of a light source and the like. Besides, not only is a switch to input an operation command to the sections of the optical apparatus provided, but a display section to display conditions of the respective sections of the optical apparatus including the objective switching device is also provided in the controller 162.

Figure 14:
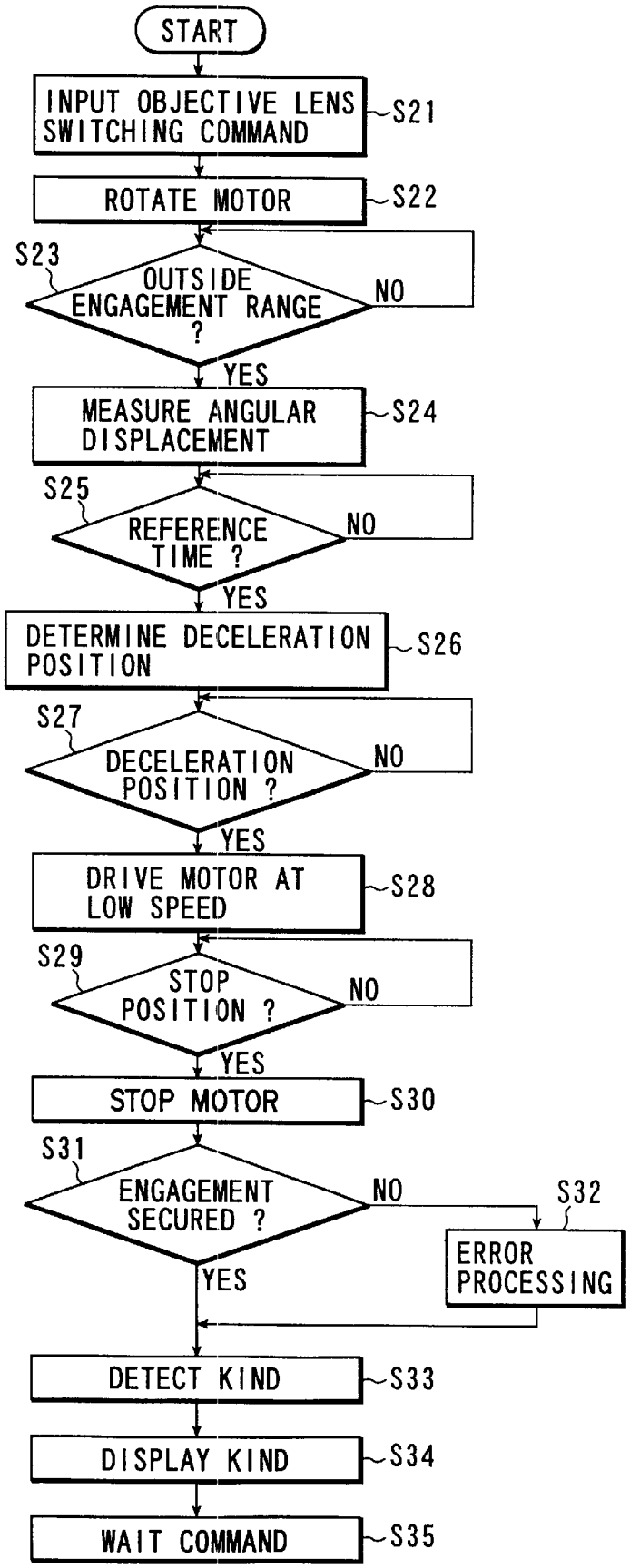
FIG. 14 is a flow chart illustrating action of the third embodiment of the present invention.
Figure 15:
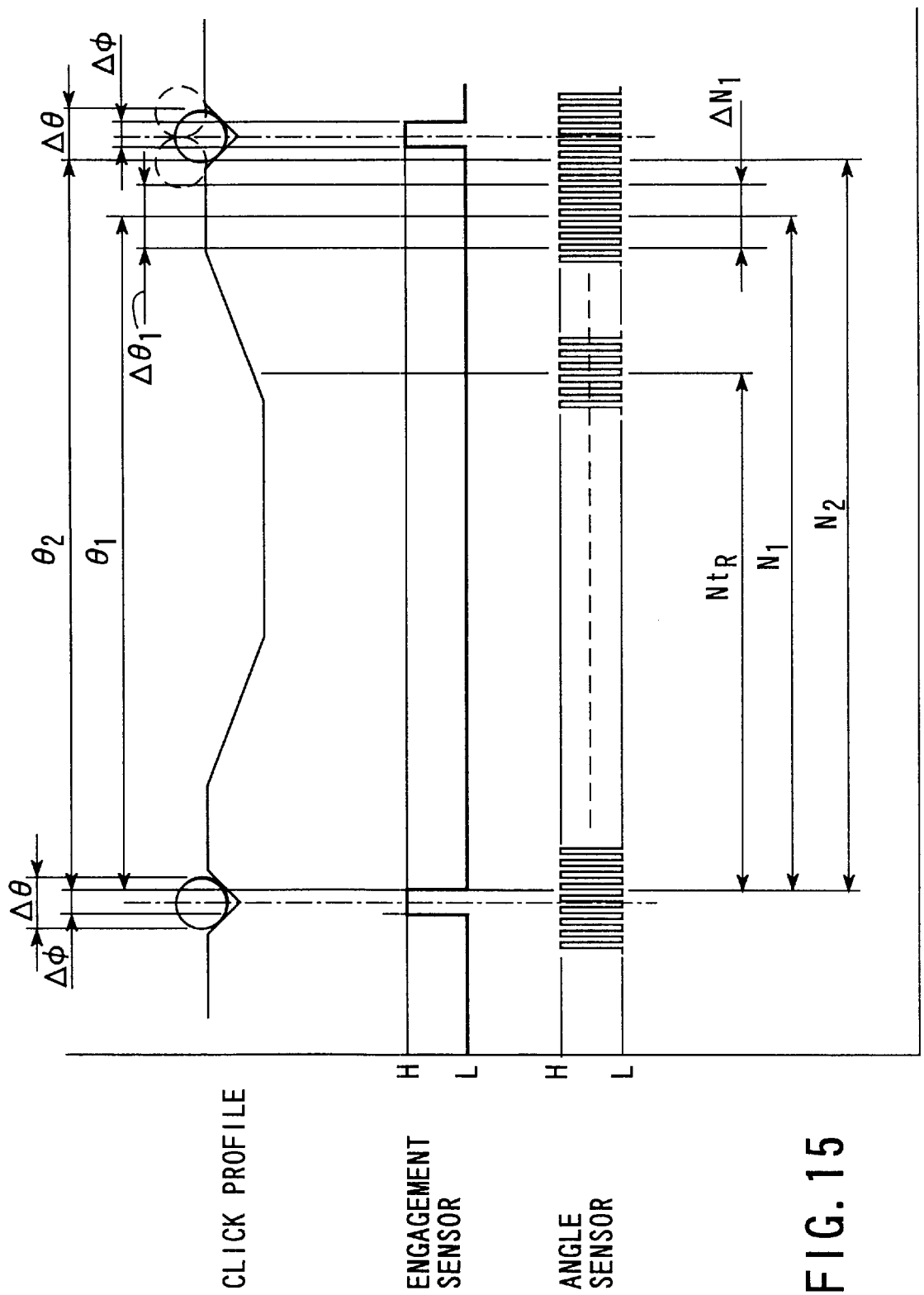
FIG. 15 is a timing chart illustrating action of the third embodiment of the present invention.

Then, described will be operations of the third embodiment in reference to the flow chart of FIG. 14 and the timing chart of FIG. 15.

At step S21, an objective lens switching command is input by a switch of the controller 162 and thereafter that program flow goes to step S22. At step S22, a direction of revolution and the number of switching stages of the turret 106 (one stage means a single switching action between a pair of objective lens mounting sections adjacent to each other) are determined by the CPU 164 and a command of rotation of the motor 120 is issued to the driver 166.

At step S23, when the engagement sensor 148 detects that engagement of the turret 106 is undone after the motor 120 gets activated, the angle sensor 150 is reset to 0 as a measured value and program flow goes to step S24 and at step S24, measurement of an angular displacement gets started from this point. When a reference time $t_R$ which is preset at step S25 is elapsed while elapsed time from the start of measurement on an angular displacement is monitored concurrently with the measurement, a moving speed is computed from a relation between angular displacement measured value ($Nt_R$) from the angle sensor 150 and the reference time $t_R$.

At step S26, thus computed moving speed is compared with a reference table in a memory 168 by the CPU 164 and a deceleration position $N_1$ in the switching action this time is determined. In the reference table, a relation between a deviation from the reference moving speed and an offset value ($\Delta N_1$) of the deceleration start position are stored as data wherein the reference moving speed and the optimal deceleration start position are empirically determined when action is performed in a predetermined condition.

Thereafter, at step S27, when a measured value of the angle sensor 150 assumes the deceleration start position ($N_1$) which was determined this time, a deceleration command of the motor 120 is supplied to the driver 166 from the CPU 164. Revolution of the turret 106 is reduced to a given low speed by deceleration of the motor 120 at step S28 and thereafter when the number of pulses of the angle sensor 150 reaches $N_2$ at step S29, a signal to completely stop the motor 120 is supplied to the driver 166 from the CPU 164 at step S30. The number $N_2$ of pulses of the angle sensor 150 is preset such that when this value is counted, the click ball 112 just enters the engagement range of the engaging groove Vb.

After stoppage of the motor 120, at step S31, an output of the engagement sensor 148 is confirmed by the CPU 164. If it is confirmed, here, that the click ball 112 resides in the engagement range $\Delta\theta$, then program flow goes to step S33. On the other hand, if the click ball 112 does not reside n the engagement range $\Delta\theta$, program flow goes to step S32 and an error processing is executed to secure the engagement as in the first and second embodiments described above.

At step S33, an output of the identification sensor 146 is confirmed by the CPU 164. If it is confirmed, here, that the output shows coincidence with an objective lens mounting section 106b of the switching command input to the controller 162, program flow goes to step S34 and a kind 106b of the objective lens mounting section is presented on the display section of the controller 162. Then, at step S35, input of a next switching command from the controller 162 is awaited.

In such a manner, in the third embodiment, an moving speed in the reference time preset in the course of each switching action is computed, the moving speed is then compared with the reference table in a memory and thereby a deceleration start position of the motor is determined. Hence, a deceleration position of the motor can optimally be set in adaptation to each switching action, even if a mounting condition of an objective lens is changed during a switching operation and thereby an inertial load on the drive means is changed, or a mechanical resistance in a turret revolving section is changed over time in use and thereby a load imposed on the drive means is changed.

As a result of this, there does not arise inconveniences that a deceleration position of the turret is either short of traveling before a click groove or overrun past the click groove, which are resulted in no occurrence of non-engagement, and thus a stable objective lens switching action can be realized.

In the third embodiment described above, while a moving speed of the turret has been measured by the number $Nt_R$ of pulses of the angle sensor in the reference time $t_R$, a time $t_{NR}$ required for revolution corresponding to the number $N_R$ of pulses which is preset may be measured.

Then described will be the fourth embodiment of the present invention.

The fourth embodiment is that, while the third embodiment determines a deceleration position by measuring a moving speed each time when one switching action is performed, a deceleration position of the switching action pattern this time is determined using a moving speed of a previous same switching action pattern.

Since a structure of the fourth embodiment is the same as that of the third embodiment, description on the structure is omitted.

Figure 16:
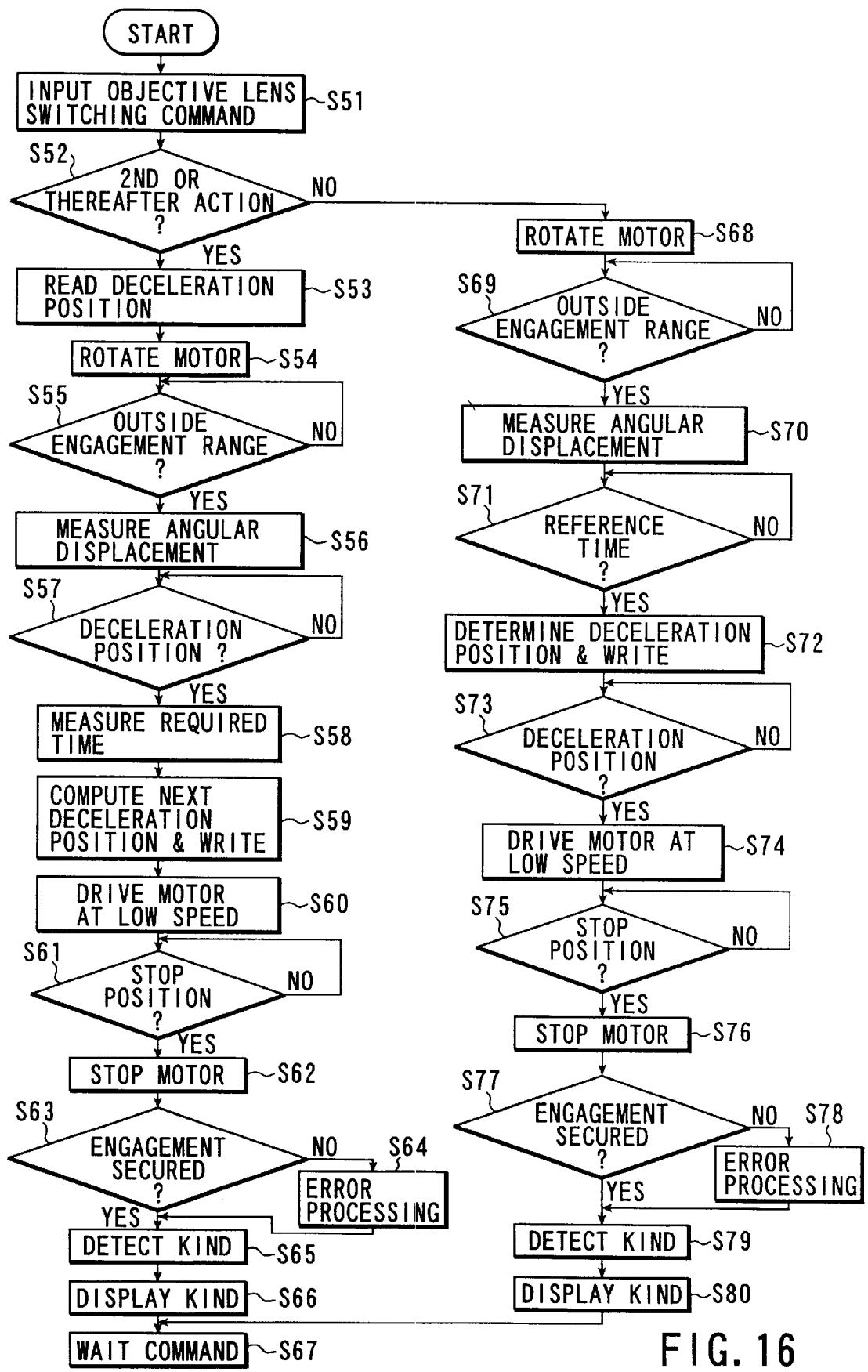
FIG. 16 is a flow chart illustrating action of a fourth embodiment of the present invention.

Described below will be action of the fourth operation in reference to the flow chart of FIG. 16.

At step S51, an objective lens switching command is input by a switch of the controller 162 and at step S52, it is determined whether or not the switching action pattern is the first action after an electric source is turned on. If it is the first, a action similar to that of the third embodiment gets started, a moving speed is measured during the action and a deceleration position is determined. Processing between steps S68 and S80 is similar to that between steps S22 and S34 of the flow chart of FIG. 14 in the third embodiment, description on the steps is omitted.

If a deceleration position has been determined by the processing between steps S68 and S80, the data is written in the memory 168 as the first deceleration position of this switching action pattern by the CPU 164. Similar are a series of operations such as deceleration of the motor 120 at the determined deceleration position, stoppage of the motor 120 at a stop position, confirmation of engagement, error processing, detection of a kind and display of the kind to those of the third embodiment.

On the other hand, at step S51, an objective lens switching command is input from the controller 162, at step S52 if the switching action pattern is a pattern which has been experienced till now after the electric source was turned on, program flow goes to step S53.

At step S53, first of all a reference data stored in the memory 168, that is a deceleration position data in the same action pattern of the previous operation is read and a deceleration position of this action is set. At the same time, a direction of revolution and the number of switching stages of the turret 106 are determined by the CPU 164 and at step S54, a command of rotation of the motor 120 is issued to the driver 166.

When it is detected by the engagement sensor 148 at step S55 that engagement of the turret 106 is undone after the motor 120 is activated, a measured value by the angle sensor 150 is reset to 0. At step S56, measurement of an angular displacement gets started at this position.

Then, at step S57, when a measured value reaches the deceleration position in this operation which was set in the previous operation, a deceleration command of the motor 120 is supplied to the driver 166 from the CPU 164. At this point, at step S58, measured is an elapsed time till the turret reaches the deceleration position of this operation after it is detected that the engagement is undone in the CPU 164. Then, the measured time and the reference time corresponding to the predetermined deceleration time are compared with each other and thereby at step S59, it is determined whether or not the deceleration position adopted in this operation is proper and then a next deceleration position is determined. At the same time, the data is written in the data table in the memory 168.

At step S60, revolution of the turret 106 is reduced to a given low speed by decelerating the motor 120 and thereafter, at step S61, when the number of pulses of the angle sensor 150 reaches $N_2$, a signal to completely stop the motor 120 is supplied to the driver 166 from the CPU 164. Setting the number $N_2$ of pulses is same as that in the third embodiment mentioned above.

Also similar are series of actions including confirmation of engagement after the motor is stopped, error processing, detection of a kind and display of the kind at steps S62 to S66 to those at steps 30 to S34 in the flow chart of FIG. 14 in the third embodiment described above and therefore description on the steps is omitted. Then, program flow goes to step S67 and at the step a next switching command is awaited till being input from the controller 162 and the action is completed.

As described above, in the fourth embodiment, the deceleration position determined in the same objective lens switching pattern of the previous action is read out from a memory as a deceleration position of this action and a deceleration position in the same switching pattern of a next action is written for renewal based on an elapsed time required for reaching the deceleration position. Hence, the optimal deceleration position for the motor can be obtained for each objective lens switching pattern.

Since a deceleration position of a next action is determined after an action state of the turret is detected in a broader range as compared with the third embodiment described above, a deceleration position can be set more correctly.

In the fourth embodiment, while a data of the deceleration position is renewed for each switching action in the same switching pattern, a renewal of a deceleration position may be skipped when there is not a great change in a mounting condition of an objective lens or mechanical loading characteristics of the turret.

In the third and fourth embodiments, while a deceleration position of the motor is changed according to an actual drive speed of the turret, adopted can be a change in short-circuit time between the terminals of a motor for deceleration with no change of a deceleration position or a change in a drive speed during a low drive condition till a stop timing, with a fixed deceleration position.

Then described will be the fifth embodiment of the present invention.

The fifth embodiment is an embodiment which suppresses production of bubbles, when an objective lens for substitution is positioned on an optical axis, by effecting a different braking from in the case of an ordinary dry objective only when the objective lens is a liquid-immersed objective lens such as an oil-immersed objective lens or a water-immersed objective lens.

That is, in FIG. 5A, filled with, for example, oil or water is a space on a viewed specimen 100 directed by an arrow A in the figure. The other parts of constitution are same as those in the third and fourth embodiments and therefore, description on the other parts is omitted.

Figure 17:
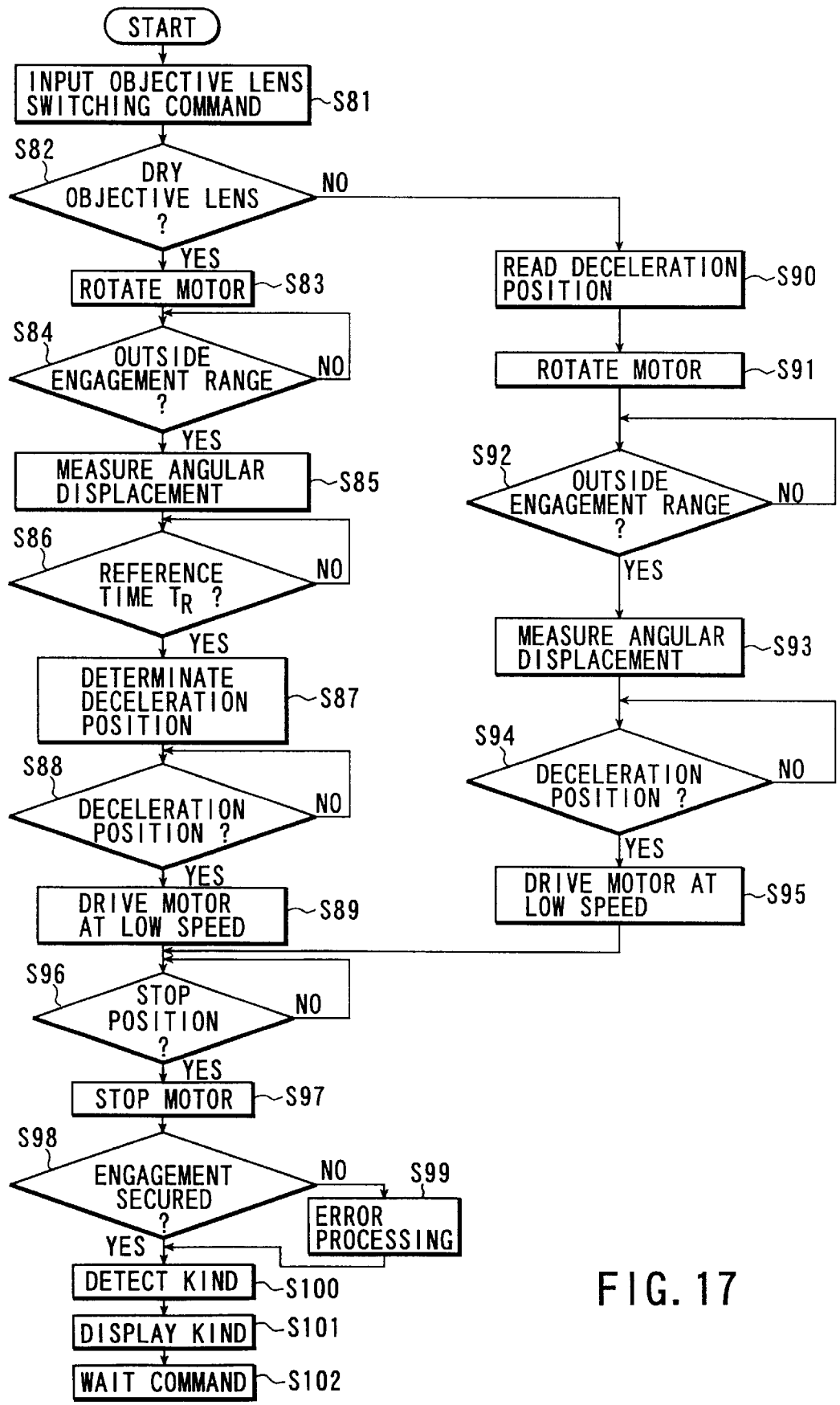
FIG. 17 is a flow chart illustrating action of a fifth embodiment of the present invention.

Described will be action in the fifth embodiment in reference to the flow chart of FIG. 17.

In the case of the fifth embodiment, kinds of objective lenses mounted to objective lens mounting sections 106a to 106e of the turret 106 are initially set by being input from the controller 162.

Figure 1:
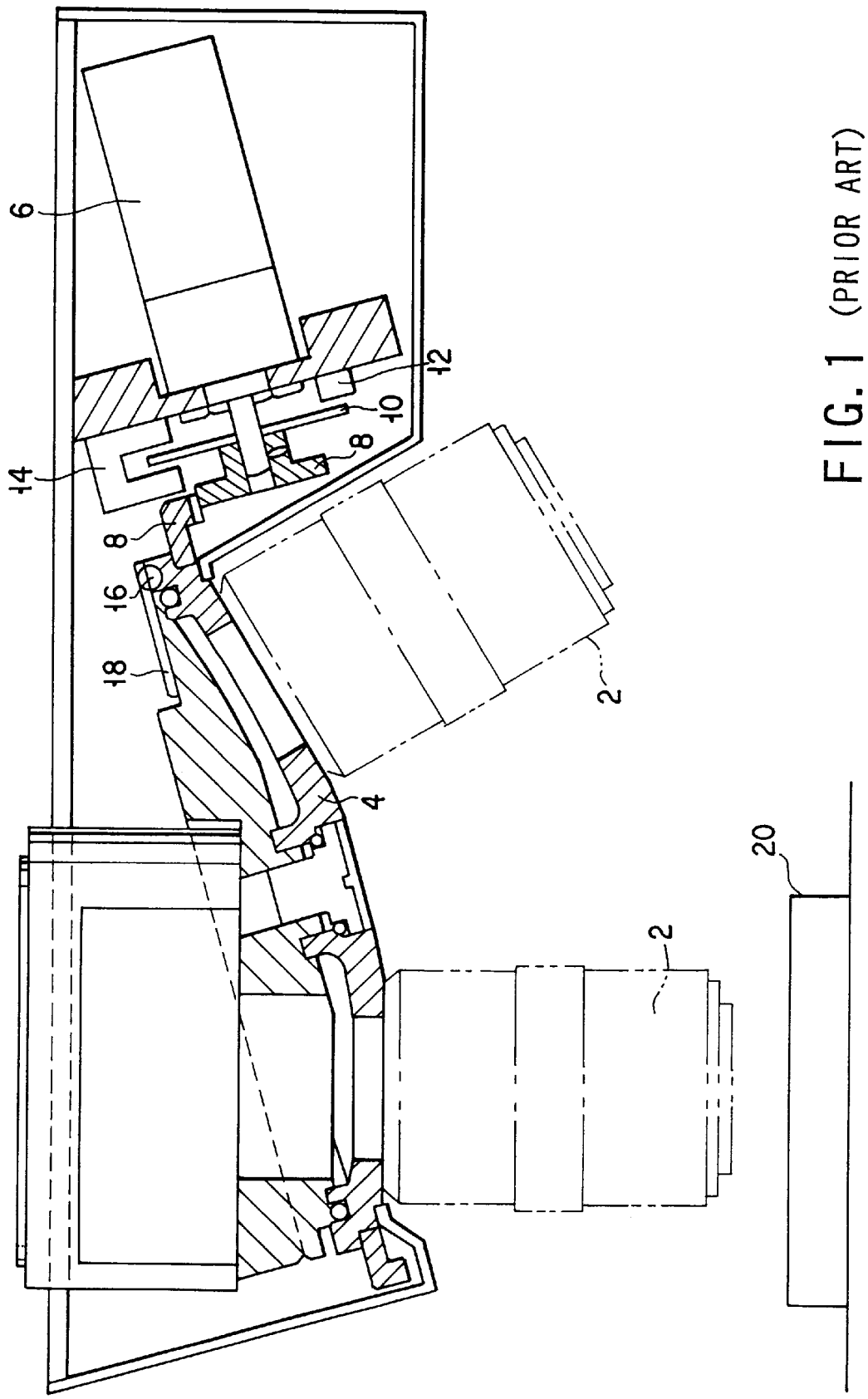
FIG. 1 is a sectional view showing a structure of a first conventional example of a switching device, a revolver.
Figure 2:
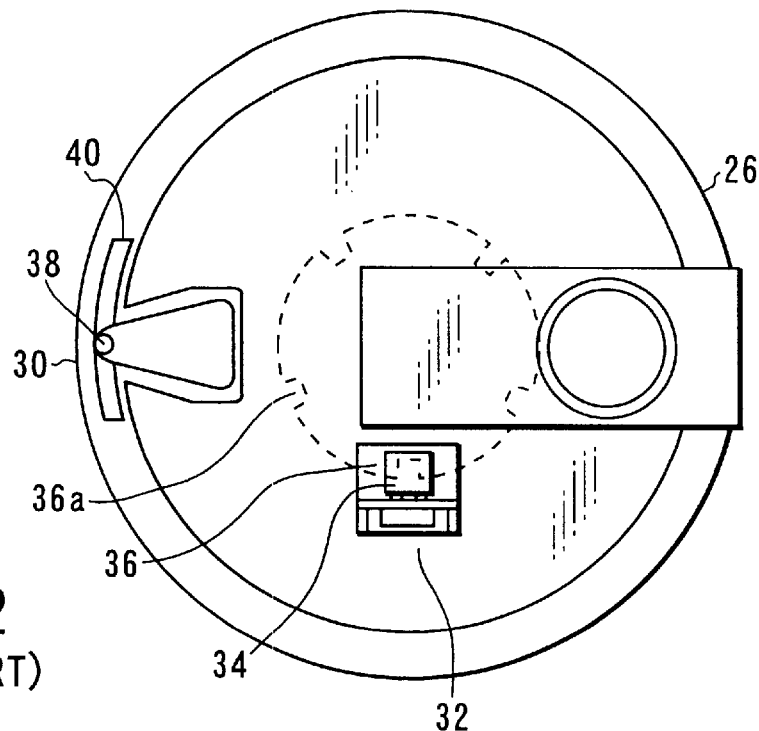
FIG. 2 is a view showing a structure of a second conventional example of a revolver.
Figure 3:
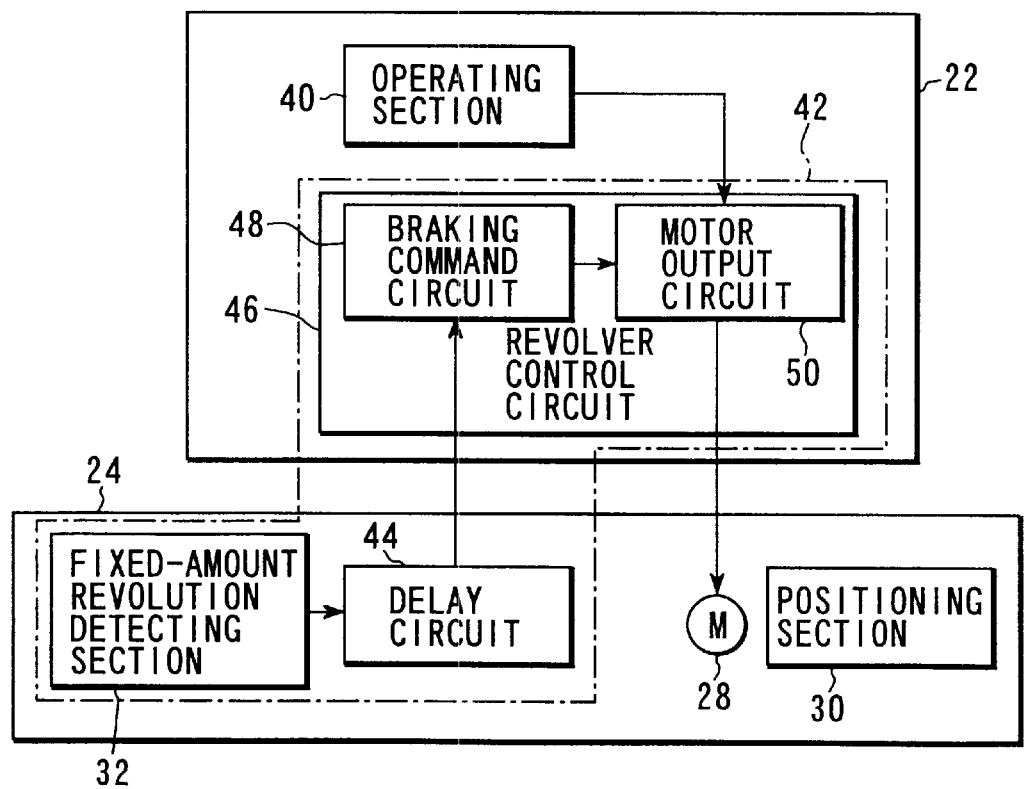
FIG. 3 is a block diagram showing a constitution of the second conventional example of a revolver.
Figure 4:
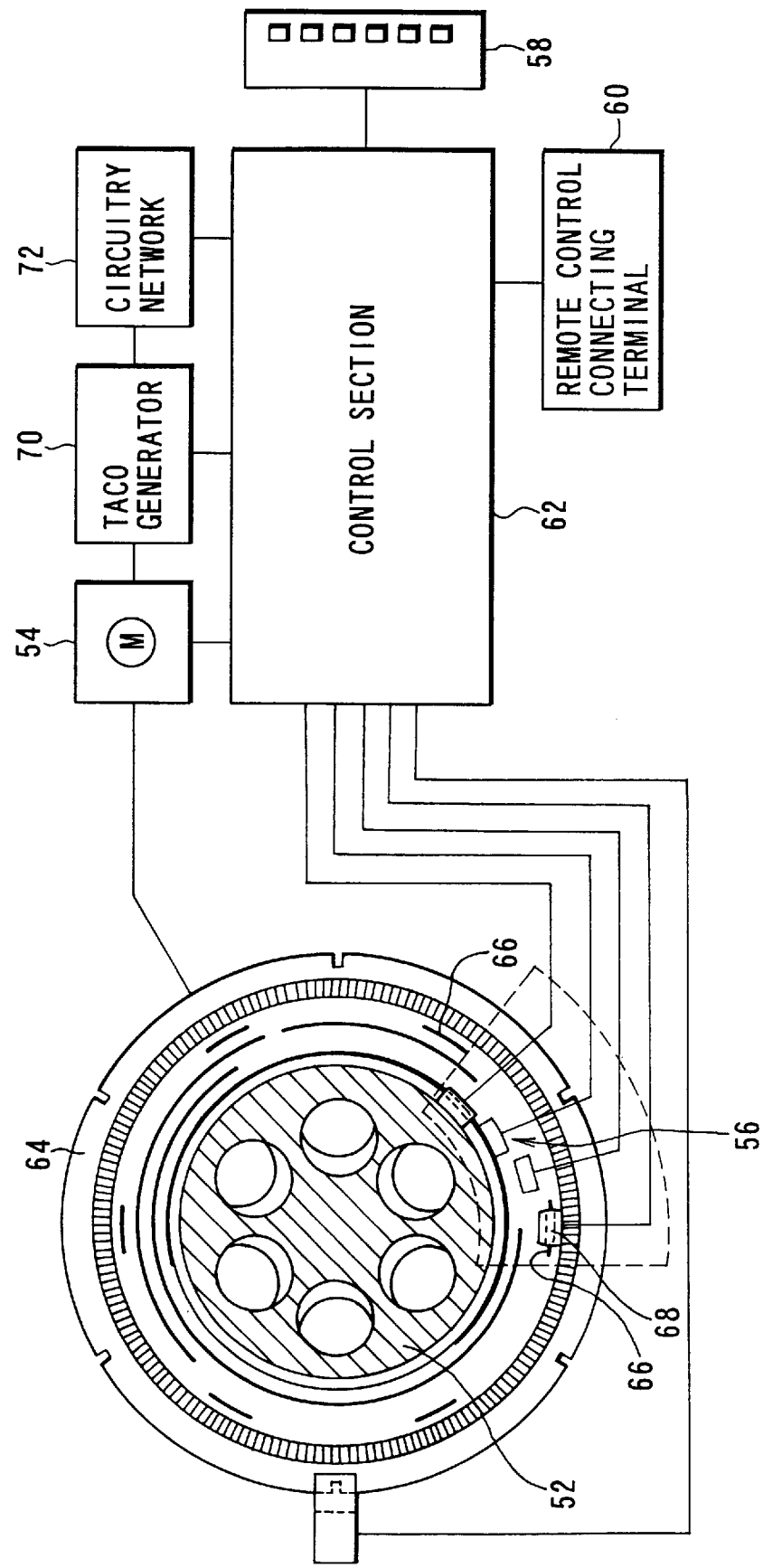
FIG. 4 is an illustration of a structure and peripheral sections of the third conventional example of a revolver revolving device.

At step S81, an objective lens switching command is input from a switch of the controller 162 and then at step S82, a kind of an objective lens which has been input for substitution is determined. At this point, while, when this case is a case of a dry objective lens (with no liquid A), processing between steps S83 and S89 is executed and the processing is absolutely same as that between steps S22 and S28 in FIG. 4 in the third embodiment described above. Therefore, description on the processing is omitted.

At the step S82, if an objective lens substitution is determined to be a liquid immersion type objective lens (with a liquid A), program flow goes to step S90 and a deceleration position for a liquid immersion type objective lens is read out from a reference table in a memory 168 by a CPU 164 and a deceleration position in this action is set. Then, at step S91, revolution of the turret 106 is activated, thereafter at step S92 the turret 106 is moved free of a engagement range and at step S93, measurement on an angular displacement gets started.

At step S94, if an angular displacement reaches the deceleration position for a liquid immersion type objective lens which has already been set, program goes to step S95 and a signal for deceleration is sent to a driver 166 from the CPU 164 to decelerate the motor 120. In this case, a drive speed after the deceleration is reduced as much as possible to a lower level than the case of an ordinary dry type objective lens. If the turret reaches the engagement range, the motor 120 is stopped from rotation as in the case of a dry type objective lens.

Processing actions in a series of steps between steps S96 to S102 are similar to those in the dry type objective lens case of the third embodiment and the processing actions are exerted in absolutely the same ways as those in a series of steps S29 to S35 of FIG. 14. Hence, description on the steps is omitted herein.

In such a manner, according to the fifth embodiment, wherein an objective lens for substitution is of a liquid immersion type, the motor is decelerated at a deceleration position different from the case of a dry type, that is at a deceleration point before and farther from the engagement position than the case of a dry type and the motor is stopped after the turret is driven to the engagement position at an extremely low speed. Therefore, alleviated is a shock when a leading edge of the liquid immersion type objective lens comes to contact with oil, water and the like on the viewed specimen surface and as a result bubble production can greatly be suppressed when the liquid immersion type objective lens is positioned on the optical axis.

Then, described will be action of the sixth embodiment in which an objective lens switching device has such a constitution. A structure of the sixth embodiment is same as that of the first embodiment and therefore description on the structure is omitted.

Figure 18:
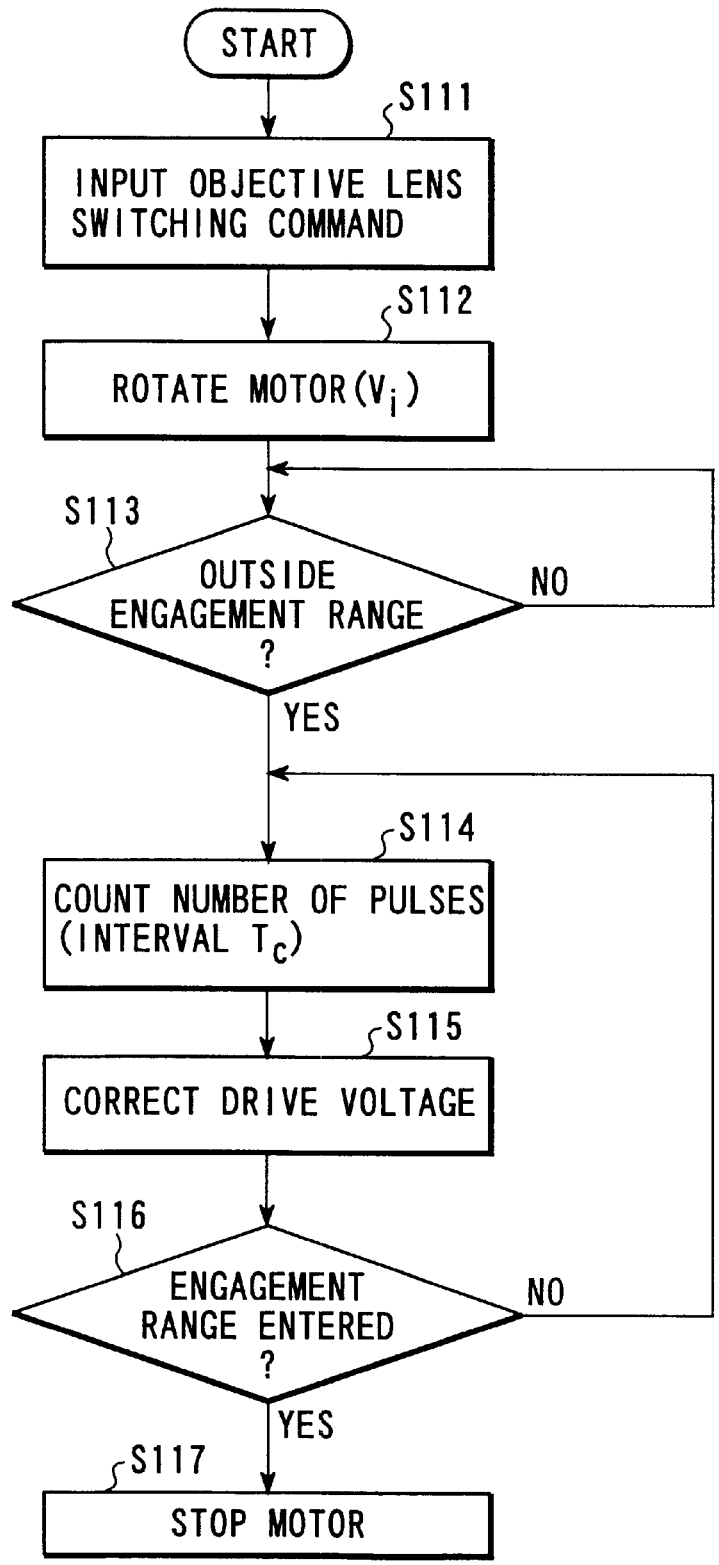
FIG. 18 is a flow chart illustrating of action of an objective lens switching device in a sixth embodiment of the present invention.

Described below is action of an objective lens switching device according to the sixth embodiment in reference to the flow chart of FIG. 18.

First of all, at step S111, an objective lens. switching command of the controller 142 is input, then the identification sensor 146 detects a kind of one of the objective lens mounting sections 106a to 106e and the CPU 144 compares the kind of one of the objective lens mounting sections 106a to 106e with a kind of the one of the objective lens mounting sections 106a to 106e for substitution input from the controller 142 to determine a direction of revolution and the number of switching stages of the turret 106 (one stage means a single switching action between a pair of objective lens mounting sections adjacent to each other). Then, at step S112, a command to rotate the motor 120 is issued to the driver 152. A content of the command in this case is a drive voltage (Vi) and a direction. The Vi is an initial voltage when the motor is activated.

After the motor gets started, at step S113 the engagement sensor 148 determines whether or not engagement of the turret 106 is undone. At this point, at the same time when it is detected that the engagement of the turret 106 gets undone, a speed control is performed in the CPU 144 based on the angle sensor 150. That is, at step S114, pulses of the angle sensor 150 are constantly counted and the number of counts during a constant time interval ($t_C$) is read and compared with a given number of pulses.

The given number of pulses is, for example, a number in a table as shown in FIG. 19 and as a result of the comparison, if the actual number of pulses is smaller than that in the table, program goes to step S115 and a drive voltage is increased at a constant rate. To the contrary, if the actual number is larger, the drive voltage is decreased.

It is assumed that a relation between the slit plate 132 and the photo-sensor 134 is set such that the number of interceptions by the slit plate 132 for switching objective lenses (switching between a pair of adjacent objective lenses) equals to 1000 pulses. If a set switching time (a time required for switching between a pair of adjacent objective lenses) is 0.5 sec and $t_C$ (time interval) is 5 msec, the given pulses (Pc) is 10 pulses. A drive voltage control in this case is as shown in FIG. 20A or FIG. 20B.

That is, the drive voltage shown in FIG. 20A or FIG. 20B is controlled based on the table shown in FIG. 19. A drive voltage is obtained such that the number of pulses shown in the table of FIG. 19 is subtracted by the number of pulses actually counted and a drive voltage is changed based on the remainder, more exactly the drive voltage is increased or decreased at a rate of 5% per one pulse.

The comparison with the given number of pulses and the variation of a drive voltage is performed till in the vicinity of the target engagement range. At step S116, when the engagement sensor assumes an on state, program flow goes to step S117 and the motor is stopped there. Thereby, a target objective lens is aligned on the optical axis.

According to the sixth embodiment, as mentioned above, an angle of the turret is read at constant intervals and thereby a speed of revolution is detected and a drive voltage of the motor is variable so as to achieve a given speed of rotation. Therefore, a switching time is stable at a constant value and a speed when the turret is stopped is constant. Hence, there can be enjoyed an advantage that an stop action is stable. That is, the stop action including oscillation is not changed even when a load or the like is changed.

Then, described will be the seventh embodiment of the present invention.

A fundamental structure of the seventh embodiment is based on the structure of FIG. 8 used in the sixth or first embodiment described above, whereas it is different in that an adjusting switch for an objective lens switching speed is added to the controller 142. The other constituents of the structure are omitted.

As shown FIG. 21A, the adjusting switch 156a for an objective lens switching speed is, for example, of a four stage switching type and a position marked by "1" is for the lowest switching speed and a position marked by "4" is for the highest switching speed. A switch signal is sent to the CPU 144 from the adjusting switch 156a for an objective lens switching speed as in the cases of other switches included in the controller 142.

Figure 22:
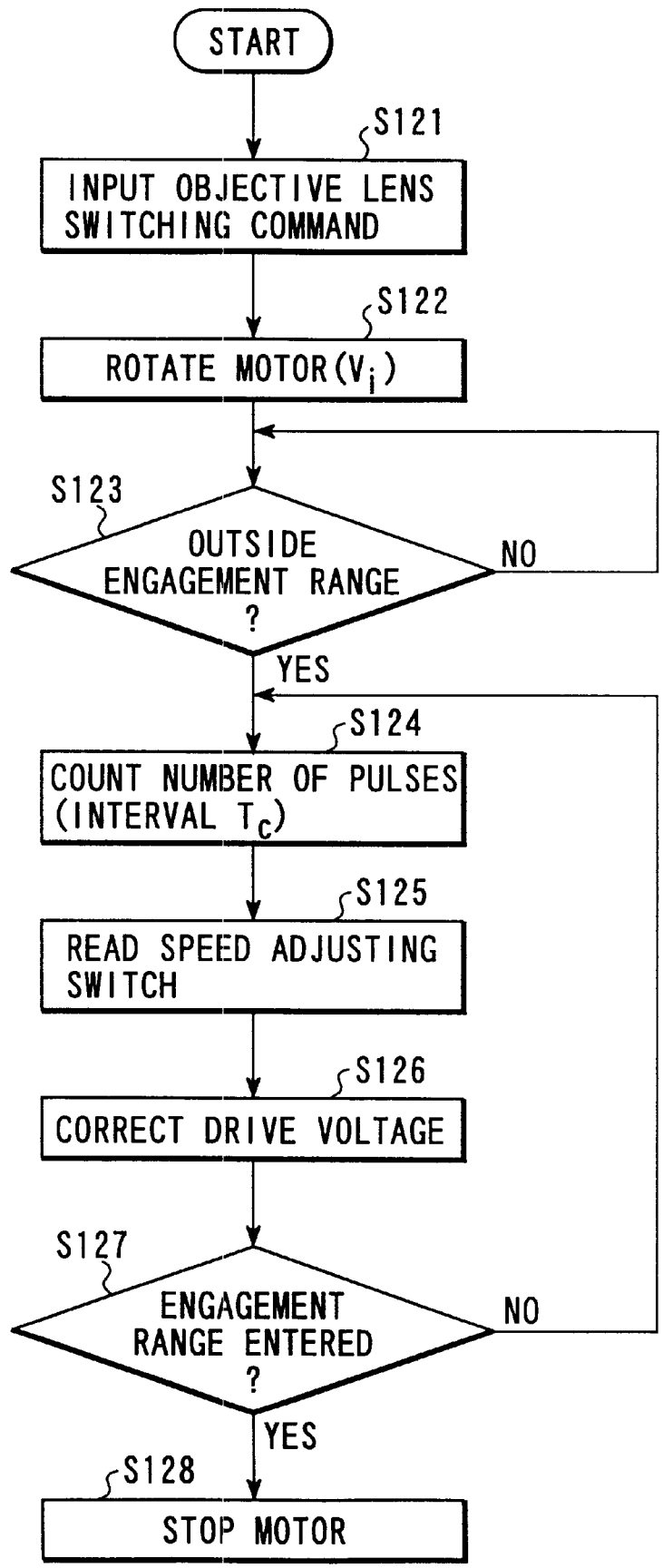
FIG. 22 is a flow chart illustrating action of the seventh embodiment of the present invention.

Then, described will be operation of the seventh embodiment in reference to the flow chart of FIG. 22.

First of all, at step S121, an objective lens switching command of the controller 142 is input. Then the identification sensor 146 detects a kind of one of the objective lens mounting sections 106a to 106e and the CPU 144 compares the kind of one of the objective lens mounting sections 106a to 106e with a kind of the one of the objective lens mounting sections 106a to 106e for substitution input from the controller 142. Then the CPU 144 determines a direction of revolution and the number of switching stages of the turret 106 (one stage means a single switching action between a pair of objective lens mounting sections adjacent to each other) and a command to rotate the motor 120 is issued to the driver 152. A content of the command in this case is a drive voltage (Vi) and a direction. The Vi is an initial voltage when the motor 120 is activated.

After the motor 120 gets started, at step S123, it is determined by the engagement sensor 148 whether or not the engagement of the turret 106 is undone. Here, speed control gets started by the CPU 144 based of the angle sensor 150 at the time when it is detected that the engagement of the turret 106 gets undone.

At step S124, pulses of the angle sensor 150 are constantly counted and the number of pulses counted for a constant time interval (tc) is read. At step 125, the adjusting switch 156a for an objective lens switching speed is read and at step S126 which follows the step S125, performed is computation of a drive voltage corresponding to this setting.

The computation of a drive voltage is performed such that settings of the four stages are converted to a switching time, starting from the lowest setting and, for example, if the four settings are composed of a series of 1.0 sec, 0.7 sec, 0.5 sec and 0.4 sec, the settings respectively correspond to FIGS. 23A, 23B, 23C and 23D. In the CPU 144, a table corresponding to a state of the adjusting switch 156a for a objective lens switching speed is selected from the four tables respectively shown in FIGS. 23A to 23D. Then, a drive voltage corresponding to the tables of FIGS. 20A, 20B is set as in the sixth embodiment described above based on the selected table.

At step S127, an engagement range is determined and if the engagement sensor 148 assumes an on state, program goes to step S128 and action of the motor 120 is stopped.

Setting of a switching time is determined so as to be in a range in which an action (stoppage) is normally performed, that is in a range in which there arises neither overrun or shortage of travel.

As described above, according to the seventh embodiment, a user can change a switching speed of objective lenses depending on conditions and thereby there can be realized either minimizing oscillation when the stoppage occurs by setting a low speed or increasing a switching speed focusing attention on time requirement.

In the example described above, a four stage switch has been used as an adjusting switch 156a for an objective lens switching speed, there is no specific limitation to this. For example, an adjusting switch 156b for an objective lens switching speed of a volume control type as shown in FIG. 21B may be substituted for a finer adjustment. In that case, an A/D converter is naturally provided in the CPU 144 side.

As described above, while in the sixth and seventh embodiments a speed control is performed by changing a drive voltage, a drive voltage is fixed at a constant value and a PMW drive may be adopted. In this case, a duty is variable. These are description when a DC motor is used as a drive source, but other types of motor such as a stepping motor may be used and, for example in the case of a stepping motor, applied can be a method with a variable drive frequency within an range in which no state out of control occurs.

In addition, in the sixth and seventh embodiments described above, while a method in which the number of counts of the angle sensor 150 is read at constant intervals has been used, to the contrary, a time length in which a constant number of counts is obtained may be measured.

Furthermore, in the sixth and seventh embodiments described above, while a range in which a speed is controlled is determined by the engagement sensor 148, the range may be determined based on a predetermined elapsed time length after activation of the motor 120.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An objective lens switching device comprising:

a turret on which a plurality of objective lenses are mountable;

drive means for electrically revolving the turret;

transfer means for transferring a revolving force from the drive means to the turret;

engaging means for accurately positioning one of the plurality of objective lenses on an optical axis of an optical apparatus;

operating means for inputting an objective lens switching command; and control means for controlling rotation of the drive means according to the switching command input by the operating means, wherein one of the plurality of objective lenses is selected and positioned on the optical axis of the optical apparatus, wherein the objective lens switching device further comprises engagement detecting means for detecting that a revolution position of the turret is in an engagement range of the engaging means, and angle detecting means for detecting an angular displacement of the drive means, and wherein the control means performs braking of the drive means to drive the turret at a low speed after the angle detecting means detects a first angle of revolution which is smaller than a necessary angle of revolution of the turret according to the switching command input by the operating means, and then the control means performs braking to completely stop the drive means after the angle detecting means detects a second angle of revolution larger than the first angle of revolution.

2. An objective lens switching device according to claim 1, wherein said angle detecting means comprises:

a slit plate provided for the drive means and having a large number of slits which are radially formed in a uniform manner; and a photosensor provided for a fixing member of the drive means.

3. An objective lens switching device according to claim 2, wherein said photosensor generates a pulse signal in accordance with the angular displacement of the drive means.

4. An objective lens switching device according to claim 1, wherein said first angle of revolution and said second angle of revolution have predetermined values.

5. An objective lens switching device according to claim 1, wherein:

measurement of the first and second angles of revolution is started when the engagement detecting means detects a disengagement from the engaging means, and the first and second angles of revolution are angles between a disengage position, where the disengagement from the engaging means occurs, and predetermined positions.

6. An objective lens switching device according to claim 1, wherein said drive means comprises a motor with terminals and is braked by short-circuiting of the terminals.

7. An objective lens switching device according to claim 1, further comprising means for executing error processing when the engagement detecting means detects that no engagement is secured, and means for stopping the drive means after engagement is secured by the error processing.

8. An objective lens switching device comprising:

a turret on which a plurality of objective lenses are mountable;

a driving source which electrically revolves the turret;

a transfer mechanism for transferring a revolving force from the driving source to the turret;

an engaging mechanism which accurately positions one of the plurality of objective lenses on an optical axis of an optical apparatus;

an operating section which inputs an objective lens switching command; and a controller which controls rotation of the driving source according to the switching command input by the operating section, wherein one of the plurality of objective lenses is selected and positioned on the optical axis of the optical apparatus, wherein the objective lens switching device further comprises an engagement detector which detects that a revolution position of the turret is in an engagement range of the engaging mechanism, and an angle detector which detects an angular displacement of the driving source, and wherein the controller determines a braking position of the driving source based on signals sent from the engaging mechanism and the angle detector.

* * * * *